United States Patent
Curino et al.

(10) Patent No.: US 11,429,609 B2
(45) Date of Patent: Aug. 30, 2022

(54) GEO-SCALE ANALYTICS WITH BANDWIDTH AND REGULATORY CONSTRAINTS

(71) Applicant: Microsoft Technology Licensing, LLC, Redmond, WA (US)

(72) Inventors: Carlo Aldo Curino, Sunnyvale, CA (US); Jitendra Dattatraya Padhye, Redmond, WA (US); George Varghese, Cupertino, CA (US); Ashish Vulimiri, Urbana, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1189 days.

(21) Appl. No.: 14/687,450

(22) Filed: Apr. 15, 2015

(65) Prior Publication Data

US 2016/0306849 A1 Oct. 20, 2016

(51) Int. Cl.
*G06F 16/2453* (2019.01)
*G06F 16/27* (2019.01)

(52) U.S. Cl.
CPC .. *G06F 16/24545* (2019.01); *G06F 16/24535* (2019.01); *G06F 16/24542* (2019.01); *G06F 16/24549* (2019.01); *G06F 16/27* (2019.01); *G06F 16/278* (2019.01)

(58) Field of Classification Search
CPC ......... G06F 16/24545; G06F 16/24542; G06F 16/27; G06F 16/24549; G06F 16/278; G06F 16/24535
See application file for complete search history.

(56) References Cited

U.S. PATENT DOCUMENTS

| 9,201,966 B2 * | 12/2015 | Lundberg | G06F 17/30864 |
| 2006/0242131 A1 * | 10/2006 | Okabe | G06F 17/30646 |
| 2010/0274762 A1 | 10/2010 | Murphy et al. | |
| 2010/0312783 A1 * | 12/2010 | Brady | G06F 17/30088 707/769 |

(Continued)

OTHER PUBLICATIONS

Kadambi et al, "Where in the World is my Data?" Proceedings of the VLDB Endowment, Aug. 2011, pp. 1040-1050 (Year: 2011).*

(Continued)

*Primary Examiner* — Charles D Adams

(57) ABSTRACT

Various technologies described herein pertain to controlling geo-scale analytics with bandwidth and regulatory constraints. An analytical query (e.g., a recurrent analytical query, a non-recurrent analytical query, etc.) to be executed over distributed data in data partitions stored in a plurality of data centers can be received. Moreover, a query execution plan for the analytical query can be generated, where the query execution plan includes tasks. Further, replication strategies for the data partitions can be determined. A replication strategy for a particular data partition can specify one or more data centers to which the particular data partition is to be replicated if the particular data partition is to be replicated. The tasks of the query execution plan for the analytical query can further be scheduled to the data centers based on the replication strategies for the data partitions. The analytical query can be part of a workload of analytical queries.

20 Claims, 11 Drawing Sheets

(56) References Cited

U.S. PATENT DOCUMENTS

| | | | | |
|---|---|---|---|---|
| 2011/0196833 | A1* | 8/2011 | Drobychev | G06F 17/30575 707/634 |
| 2012/0259866 | A1* | 10/2012 | Austin | G06F 16/958 707/748 |
| 2013/0124809 | A1 | 5/2013 | DeJana et al. | |
| 2013/0185256 | A1 | 7/2013 | Alatorre et al. | |
| 2014/0164430 | A1* | 6/2014 | Hadjieleftheriou | G06F 17/30283 707/770 |
| 2014/0280032 | A1* | 9/2014 | Kornacker | G06F 17/30545 707/718 |
| 2015/0286508 | A1* | 10/2015 | Stowe | G06F 9/505 718/105 |
| 2015/0302036 | A1* | 10/2015 | Kumar | G06F 17/30867 707/711 |

OTHER PUBLICATIONS

"International Search Report and Written Opinion for PCT Patent Application No. PCT/US2016/025960", dated Sep. 13, 2016, 18 pages.

Vulimiri, et al., "WANalytics: Analytics for a Geo-Distributed Data-Intensive World", In Conference on Innovative Data Systems Research, 2015, 9 pages.

Han, et al., "Progressive Optimization in a Shared-Nothing Parallel Database", In Proceedings of 2007 ACM SIGMOD International Conference on Management of Data, Jun. 11, 2007, 12 pages.

Karanasos, et al., "Dynamically Optimizing Queries Over Large Scale Data Platforms", In Proceedings of the 2014 ACM SIGMOD International Conference on Management of Data, Jun. 22, 2014, 12 pages.

Repantis, et al., "Scaling a Monitoring Infrastructure for the Akamai Network", In ACM SIGOPS Operating Systems Review, vol. 44, No. 3, 2010, 7 pages.

Mackert, et al., "R* Optimizer Validation and Performance Evaluation for Distributed Queries", In Proceedings of the 12th International Conference on Very Large Data Bases, Aug. 1986, pp. 149-159.

Abu-Libdeh, et al., "RACS: A Case for Cloud Storage Diversity", In Proceedings of the 1st Symposium on Cloud Computing, Jun. 10, 2010, 11 pages.

Agarwal, et al., "Volley: Automated Data Placement for Geo-Distributed Cloud Services", In NSDI, Apr. 28, 2010, 16 pages.

Auradkar, et al., "Data Infrastructure at LinkedIn", In IEEE 28th International Conference on Data Engineering, 2012, pp. 1370-1381.

Ballinger, Carrie, "Born To Be Parallel: Why Parallel Origins Give Teradata Database an Enduring Performance Edge", Retrieved At <<//www.teradata.com/white-papers/born-to-be-parallel-teradata-database>>, Retrieved Date: Mar. 11, 2015, pp. 1-19.

Bernstein, et al., "Query Processing in a System for Distributed Databases (SDD-1)", In ACM Transactions on Database Systems, vol. 6, No. 4, Dec. 1981, pp. 602-625.

"Big Data Benchmark", Retrieved At <<https://amplab.cs.berkeley.edu/benchmark/>>, Retrieved Date: Mar. 11, 2015, pp. 1-7.

Cao, et al., "Efficient Top-K Query Calculation in Distributed Networks", In Proceedings of the 23rd Annual ACM Symposium on Principles of Distributed Computing, Jul. 25, 2004, pp. 206-215.

Cooper, et al., "PNUTS: Yahoo!'s Hosted Data Serving Platform", In Proceedings of the VLDB Endowment, Aug. 24, 2008, 12 pages.

Cooper, et al., "Benchmarking Cloud Serving Systems with YCSB", In Proceedings of the 1st Symposium on Cloud Computing, Jun. 10, 2010, 12 pages.

Corbett, et al., "Spanner: Google's Globally-Distributed Database", In 10th USENIX Symposium on Operating Systems Design and Implementation, 2012, pp. 251-264.

Dean, et al., "MapReduce: Simplified Data Processing on Large Clusters", In 6th Symposium on Operating Systems Design and Implementation, Oct. 3, 2004, pp. 1-25.

Dewitt, et al., "Parallel Database Systems: The Future of High Performance Database Processing", In Communications of the ACM, Jan. 1992, 30 pages.

"Commission to Pursue Role as Honest Broker in Future Global Negotiations on Internet Governance", European Commission Press Release, Feb. 12, 2014, Retrieved At <<http://europa.eu/rapid/press-release_IP-14-142_en.htm>>, Feb. 12, 2014, 2 pages.

Gao, Lixin, "On Inferring Autonomous System Relationships in the Internet", In IEEE/ACM Transactions on Networking, vol. 9, No. 6, Dec. 2001, pp. 733-745.

Ghazal, et al., "BigBench: Towards an Industry Standard Benchmark for Big Data Analytics", In Proceedings of the 2013 ACM SIGMOD International Conference on Management of Data, Jun. 22, 2013, pp. 1197-1208.

Glerum, et al., "Debugging in the (Very) Large: Ten Years of Implementation and Experience", In Proceedings of the ACM SIGOPS 22nd Symposium on Operating Systems Principles, Oct. 11, 2009, pp. 1-17.

Graefe, Goetz, "Query Evaluation Techniques for Large Databases", In ACM Computing Surveys, vol. 25, No. 2, Nov. 10, 1993, 168 pages.

Greenberg, et al., "The Cost of a Cloud: Research Problems in Data Center Networks", In ACM SOGCOMM Computer Communication Review, vol. 39, No. 1, Jan. 2009, pp. 68-73.

Gupta, et al., "Mesa: Geo-Replicated, Near Real-Time, Scalable Data Warehousing", In Proceedings of the VLDB Endowment, vol. 7, No. 12, Sep. 1, 2014, pp. 1259-1270.

Hwang, et al., "A Cooperative, Self-Configuring High-Availability Solution for Stream Processing", In IEEE 23rd International Conference on Data Engineering, 2007, 10 pages.

"Global Internet Geography", Retrieved At <<http://www.telegeography.com/research-services/global-internet-geography/>>, Retrieved Date: Mar. 11, 2015, pp. 1-3.

Kossmann, Donald, "The State of the Art in Distributed Query Processing", In ACM Computing Surveys, vol. 32, No. 4, Dec. 2000, pp. 422-469.

Laoutaris, et al., "Inter-Datacenter Bulk Transfers with NetStitcher", In ACM SIGCOMM Computer Communication Review, vol. 41, No. 4, Aug. 15, 2011, 15 pages.

Lee, et al., "The Unified Logging Infrastructure for Data Analytics at Twitter", In Proceedings of the VLDB Endowment, vol. 5, No. 12, Aug. 27, 2012, pp. 1771-1780.

"Is Query Optimization a "Solved" Problem?", ACM SIGMOD Blog, Retrieved At <<http://wp.sigmod.org/?p=1075>>, Retrieved Date: Mar. 11, 2015, pp. 1-6.

Madden, Samuel, "Database Abstractions for Managing Sensor Network Data", In Proceedings of the IEEE, vol. 98, No. 11, Nov. 2010, 9 pages.

Olston, et al., "Pig Latin: A Not-So-Foreign Language for Data Processing", In Proceedings of the 2008 ACM SIGMOD International Conference on Management of Data, Jun. 9, 2008, pp. 1099-1110.

Rabkin, et al., "Aggregation and Degradation in JetStream: Streaming Analytics in the Wide Area", In Proceedings of the 11th USENIX Symposium on Networked Systems Design and Implementation, Apr. 2, 2014, 15 pages.

Rost, et al., "Privacy by Design and the New Protection Goals", In DuD, Jan. 2011, pp. 1-9.

Shrivastava, et al., "Medians and Beyond: New Aggregation Techniques for Sensor Networks", In Proceedings of the 2nd International Conference on Embedded Network Sensor Systems, Aug. 17, 2004, pp. 1-14.

Tatarowicz, et al., "Lookup Tables: Fine-Grained Partitioning for Distributed Databases", In IEEE 28th International Conference on Data Engineering, 2012, 12 pages.

Thusoo, et al., "Hive—A Petabyte Scale Data Warehouse Using Hadoop", In IEEE International Conference on Data Engineering, 2010, pp. 996-1005.

Thusoo, et al., "Data Warehousing and Analytics Infrastructure at Facebook", In Proceedings of the 2010 ACM SIGMOD International Conference on Management of Data, Jun. 6, 2010, 8 pages.

Tridgell, et al., "The Rsync Algorithm", In TR-CS-96-05, Joint Computer Science Technical Report Series, Jun. 1996, 8 pages.

(56) References Cited

OTHER PUBLICATIONS

Vrable, et al., "Cumulus: Filesystem Backup to the Cloud", In ACM Transactions on Storage, vol. 5, No. 4, 2009, 16 pages.

Zaharia, et al., "Resilient Distributed Datasets: A Fault-Tolerant Abstraction for In-Memory Cluster Computing", In Proceedings of the 9th USENIX Conference on Networked Systems Design and Implementation, 2012, 14 pages.

Chu, et al., "Optimal Query Processing for Distributed Database Systems", In IEEE Transactions on Computers, vol. C-31, No. 9, Sep. 1982, pp. 835-850.

Swami, et al., "Optimizaton of Large Join Queries", In ACM, vol. 17, No. 3, 1988, pp. 8-17.

Ding, et al., "Automatic Data Placement and Replication in Grids", Retrieved At <<http://citeseerx.ist.psu.edu/viewdoc/download?doi=10.1.1.174.2127&rep=rep1&type=pdf>>, In International Conference on High Performance Computing, Dec. 16, 2009, 10 pages.

Xie, et al., "Improving MapReduce Performance Through Data Placement in Heterogeneous Hadoop Clusters", Retrieved At <<http://ieeexplore.ieee.org/stamp/stamp.jspfitp=&arnumber=5470880>>, In IEEE International Symposium on Parallel and Distributed Processing, Workshops and Phd Forum, Apr. 19, 2010, 9 pages.

Sivasubramanian, et al., "GlobeDB: Automatic Data Replication for Web Applications", Retrieved At <<http://dl.acm.org/citation.cfm?id=1060756>>. In Proceedings of the 14th International Conference on World Wide Web, May 10, 2005, pp. 33-42.

Decandia, et al., "Dynamo: Amazon's Highly Available Key-Value Store", Retrieved At <<http://www.read.seas.harvard.edu/~kohler/class/cs239-w08/decandia07dynamo.pdf>>, In Proceedings of the Twenty-First ACM SIGOPS Symposium on Operating Systems Principles, Oct. 14, 2007, pp. 205-220.

Chen, et al., "Providing Scalable Database Services on the Cloud", Retrieved At <<http://www.comp.nus.edu.sg/~ooibc/wise2010.pdf>>. In Proceedings of the 11th International Conference on Web Information Systems Engineering, Dec. 12, 2010, pp. 1-19.

Rabkin, et al., "Making Every Bit Count In Wide-Area Analytics", Retrieved At <<http://www.cs.princeton.edu/~sssix/papers/stream-hotos13.pdf>>. In Proceedings of the 14th Workshop on Hot Topics in Operating Systems, May 13, 2013, pp. 1-6.

Vassiliadis, Panos, "A Survey of Extract-Transform—Load Technology", Retrieved At <<http://www.cs.uoi.gr/~pvassil/publications/2009_IJDWM/IJDWM_2009.pdf>>, In International Journal of Data Warehousing & Mining, vol. 5, No. 3, Jul. 2009, pp. 1-27.

"International Preliminary Report on Patentability for PCT Patent Application No. PCT/US2016/025960", dated Jul. 17, 2017, 16 pages.

"Written Opinion for PCT Patent Application No. PCT/US2016/025960", dated Mar. 20, 2017, 8 pages.

* cited by examiner

GEO-SCALE ANALYTICS WITH BANDWIDTH AND REGULATORY CONSTRAINTS

BACKGROUND

Global scale organizations commonly produce significant volumes of data across geographically distributed data centers. Conventional systems for computing analytics over the geographically distributed data oftentimes operate by transferring most (if not all) of the data to a central location. However, at large data scales, transferring the geographically distributed data to a central location can be problematic due to limited bandwidth of trans-oceanic links. Regulatory constraints may also hamper the ability to transfer the geographically distributed data to a central location.

Vast amounts of data of an organization operating at a global scale may be analyzed. The data may be stored in multiple data centers around the world because of latency requirements for user-facing applications. Moreover, the volume of data collected by many organizations while logging user interactions, monitoring compute infrastructures, tracking business-critical functions, and so forth continues to increase.

The geographically distributed data is frequently accessed to extract insight using ad-hoc and recurrent analytical queries. For global data management systems across data centers, analytics are commonly performed across data centers by transferring the data to a central data center, where the data is processed with conventional single-cluster technologies (e.g., a single-cluster analytics system, a relational data warehouse, etc.). However, for many applications, the centralized approach can result in transfer of significant data volumes. While application demands are growing from hundreds of terabytes towards petabytes per day, network capacity growth has been decelerating. A reason for such decrease is the expense of adding network capacity (e.g., a new submarine cable connecting South America and Europe would have a significant cost to install). Scarcity of wide area network bandwidth can drive applications to discard valuable data, which likely will worsen as applications scale up and out.

There may also be privacy concerns over the geographically distributed data. Such privacy concerns may result in more regulatory constraints on data movement. For instance, local governments may impose more stringent regulatory constraints on raw data storage and transfer across geographical boundaries.

SUMMARY

Described herein are various technologies that pertain to controlling geo-scale analytics with bandwidth and regulatory constraints. An analytical query (e.g., a recurrent analytical query, a non-recurrent analytical query, etc.) to be executed over distributed data in data partitions stored in a plurality of data centers can be received. The analytical query can be part of a workload of analytical queries. Moreover, a query execution plan for the analytical query can be generated, where the query execution plan includes tasks. Further, replication strategies for the data partitions can be determined. A replication strategy for a particular data partition can specify one or more data centers to which the particular data partition is to be replicated if the particular data partition is to be replicated. The tasks of the query execution plan for the analytical query can further be scheduled to the data centers based on the replication strategies for the data partitions. The analytical query can be part of a workload of analytical queries; the analytical queries in the workload can be repeated (e.g., at the same and/or differing time intervals).

The query execution plan for the analytical query can be generated, the replication strategies for the data partitions can be determined, and the tasks of the query execution plan for the analytical query can be scheduled to the data centers based on bandwidth costs for data transfers between the data centers. The query execution plan, the data replication strategies, and the task scheduling can be jointly optimized to minimize the bandwidth costs for the data transfers between the data centers. Additionally or alternatively, the replication strategies for the data partitions can be determined and the tasks of the query execution plan can be scheduled to the data centers based on fault-tolerance constraints for the data partitions (e.g., a minimum number of copies of a given data partition, etc.) and/or regulatory constraints for the data partitions (e.g., a given data partition is prohibited from being copied to a particular data center, etc.).

Moreover, technologies set forth herein can support pseudo-distributed measurements. A modified query execution plan for the analytical query can be generated based on the query execution plan. The modified query execution plan emulates behavior of a query executing according to a new query execution plan, while a physical instantiation of the modified query execution plan respects the query execution plan. The query execution plan can be modified to collect data transfer measurements for each of the tasks during execution of the modified query execution plan. Further, the data transfer measurements for each of the tasks can be acquired during the execution of the modified query execution plan. The replication strategies for the data partitions can be determined and the tasks of the query execution plan for the analytical query can be scheduled to the data centers based on the data transfer measurements for each of the tasks acquired during the execution of the modified query execution plan.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
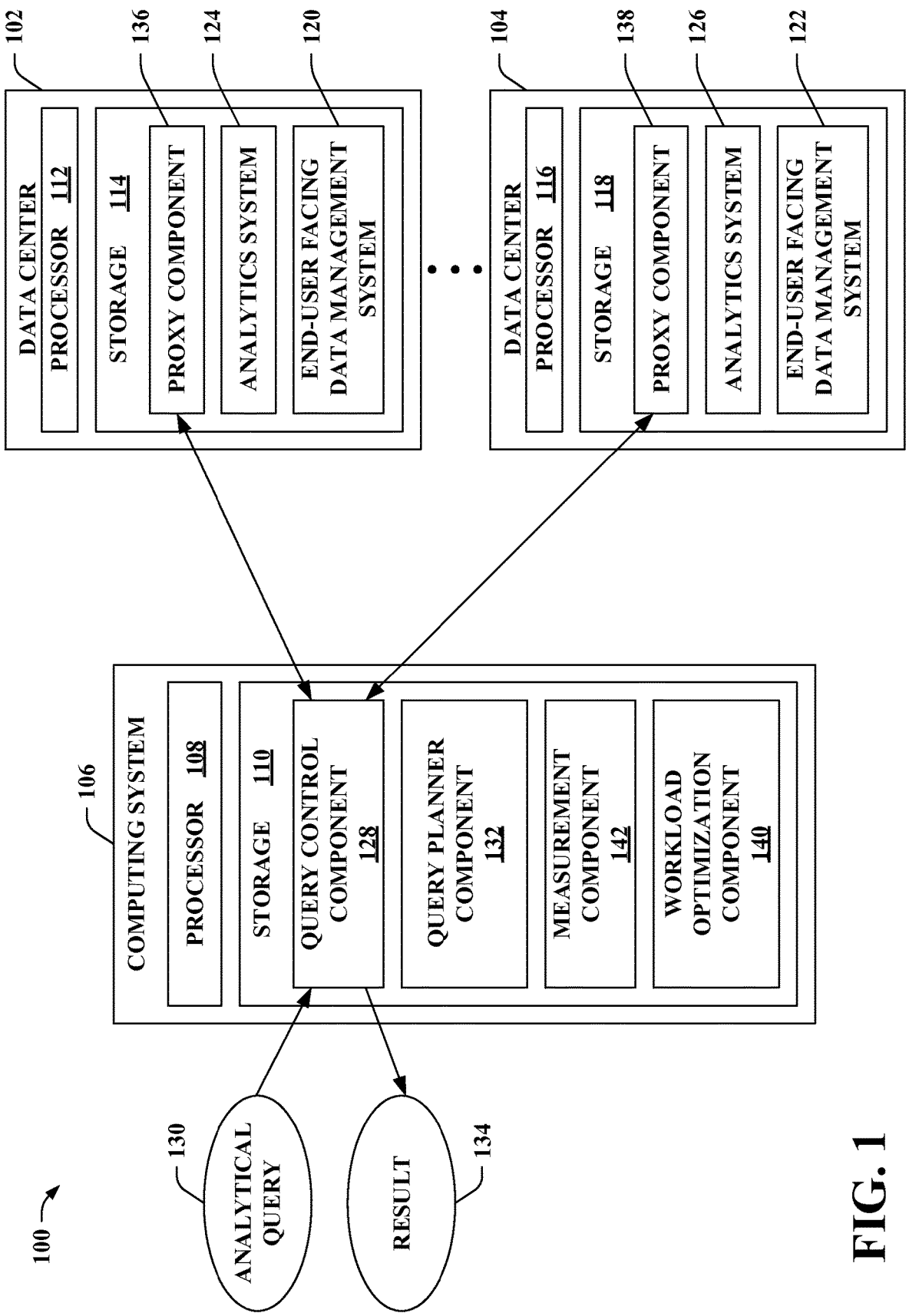
FIG. 1 illustrates a functional block diagram of an exemplary system that controls performance of geo-scale analytics over distributed data stored in a plurality of data centers.

Various technologies pertaining to controlling geo-scale analytics executed over distributed data in data partitions stored in a plurality of data centers are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that controls performance of geo-scale analytics over distributed data stored in a plurality of data centers. The system 100 includes a data center 102, . . . , and a data center 104 (collectively referred to herein as data centers 102-104). It is to be appreciated that substantially any number of data centers 102-104 are intended to fall within the scope of the hereto appended claims. The distributed data can be stored in the data centers 102-104.

Moreover, the system 100 includes a computing system 106. The computing system 106 includes at least one processor 108 and computer-readable storage 110. The processor 108 is configured to execute instructions loaded into the computer-readable storage 110 (e.g., one or more systems loaded into the storage 110, one or more components loaded into the storage 110, etc.). As described in greater detail herein, the storage 110 includes a plurality of components that control execution of geo-scale analytics on distributed data stored in the data centers 102-104. While not shown in FIG. 1, it is contemplated that a portion of the distributed data can further be stored in the storage 110 of the computing system 106.

According to various examples, the computing system 106 can be one of the data centers 102-104. Thus, the computing system 106 can include a portion of the distributed data and can execute subqueries over the portion of the distributed data. Pursuant to such examples, the computing system 106 can include an analytics system and an end-user facing data management system (as well as a proxy component) as described herein. However, it is contemplated that the computing system 106 may not be a data center in accordance with other examples.

The computing system 106 is communicatively coupled with the data centers 102-104. Moreover, the data centers 102-104 can be communicatively coupled with each other. According to an illustration, the computing system 106 can be or include one or more server computing devices. Further, the computing system 106 can be communicatively coupled with a computing device (e.g., a desktop computing device, mobile computing device, or the like used by an analyst, etc.) from which analytical queries are received and to which results of the analytical queries are transmitted; yet, the claimed subject matter is not so limited (e.g., the analyst can generate the analytical queries using the computing system 106 and obtain results for the analytical queries via the computing system 106).

The data centers 102-104 can be or include public data centers, private data centers, hybrid data centers, and/or a combination thereof. The data centers 102-104 each include one or more server computing devices. Moreover, the data centers 102-104 each include associated components, such as telecommunications and storage systems. For instance, the data center 102 can include one or more processors 112 and computer-readable storage 114 (e.g., the processor(s) 112 are configured to execute instructions loaded into the storage 114), . . . , and the data center 104 includes one or more processors 116 and computer-readable storage 118 (e.g., the processor(s) 116 are configured to execute instructions loaded into the storage 118). While not shown, other data centers included in the system 100 are intended to be similar to the data center 102 and the data center 104 described herein.

End-user interactions are handled externally to the system 100. Each of the data centers 102-104 can include a respective end-user facing data management system. More particularly, the storage 114 of the data center 102 includes an end-user facing data management system 120, . . . , and the storage 118 of the data center 104 includes an end-user facing data management system 122. The end-user facing data management system 120, . . . , and the end-user facing data management system 122 of the data centers 102-104 are collectively referred to herein as end-user facing data management systems 120-122.

The end-user facing data management systems 120-122 can be updated by interactions with a set of end-users. For instance, transactions performed at the data center 102 (e.g., by a first subset of the end-users) can cause the end-user facing data management system 120 to be updated, . . . , and transactions performed at the data center 104 (e.g., by a second subset of the end-users) can cause the end-user facing data management system 122 to be updated. The system 100 provides no control over where data is originally generated (e.g., which of the end-user facing data management systems 120-122 of the data centers 102-104 is updated with given data); for instance, data is generated in the end-user facing data management systems 120-122 based on external considerations such as latency observed by the end-users, etc.

Data in the end-user facing data management systems 120-122 can be extracted into a single-data-center analytics system at each of the data centers 102-104. Thus, the data in the end-user facing data management system 120 at the data center 102 can be extracted into an analytics system 124, . . . , and the data in the end-user facing data management system 122 of the data center 104 can be extracted into an analytics system 126. The analytics system 124, . . . , and the analytics system 126 of the data centers 102-104 are collectively referred to herein as analytics systems 124-126.

Each of the analytics systems 124-126 can be a single-data-center analytics system. The analytics systems 124-126 can be configured to query and manage data respectively included therein (e.g., the analytics system 124 can be configured to query and manage the data extracted from the end-user facing data management system 120 into the analytics system 124, etc.). According to an example, an analytics system (one of the analytics systems 124-126) can be or include a relational database. Additionally or alternatively, in accordance with another example, an analytics system (one of the analytics systems 124-126) can include a data warehouse infrastructure configured to summarize, query, and analyze data included in such analytics system; following this example, the data warehouse infrastructure can include a distributed storage and processing system for very large datasets on computer clusters.

The system 100 processes analytics over data split across multiple data centers 102-104 in the analytics systems 124-126. The data centers 102-104 (e.g., the analytics systems 124-126) can each store respective sets of data partitions. The storage 110 of the computing system 106 includes a query control component 128 configured to control processing of analytical queries over the distributed data in the analytics systems 124-126 of the data centers 102-104. The storage 110 of the computing system 106 also includes a query planner component 132 configured to generate query execution plans for the analytical queries. A query execution plan for a given query includes tasks. A task can be a subquery that operates on a set of inputs. Further, a set of inputs for a task can include data partition(s) and/or output(s) from other task(s). The query planner component 132, for example, can be a centralized query planner component. However, it is contemplated that a centralized query planner component need not be employed in the system 100 (e.g., the query planner component 132 can be configured to generate an initial query execution plan to seed the workload optimization process, the query planner component 132 and/or disparate query planner component(s) of other data center(s) 102-104 can regenerate the query execution plan, etc.); thus, while many of the examples set forth herein describe the query planner component 132 as a centralized query planner component, it is contemplated that the claimed subject matter is not so limited.

More particularly, the query control component 128 is configured to receive an analytical query 130 to be executed over distributed data in data partitions stored in the plurality of data centers 102-104. The analytical query 130 can be a recurrent analytical query or a non-recurrent analytical query. The analytical query 130 can be part of a workload of analytical queries; the analytical queries in the workload can be repeated (e.g., at the same and/or differing time intervals). The query planner component 132 is configured to generate a query execution plan (which includes tasks) for the analytical query 130 to be executed over the distributed data in the data partitions stored in the data centers 102-104. The query control component 128 is further configured to execute the query execution plan. Execution of the query execution plan can include running subqueries (e.g., the tasks) against individual data centers 102-104 and coordinating data transfers between the data centers 102-104. Thus, the query control component 128 can be configured to control the data centers 102-104 (e.g., control the analytics systems 124-126) to execute the tasks of the query execution plan for the analytical query 130 and transfer intermediate query results between the data centers 102-104. The query control component 128 can further receive one or more of the intermediate query results from one or more of the data centers 102-104. Moreover, the query control component 128 can be configured to generate a result 134 responsive to the analytical query 130 based on the one or more intermediate query results received from the one or more data centers 102-104. Thus, the query control component 128 can collate the result 134.

The data centers 102-104 can each include a proxy component. More particularly, the storage 114 of the data center 102 can include a proxy component 136, . . . , and the storage 118 of the data center 104 can include a proxy component 138. The proxy component 136, . . . , and the proxy component 138 of the data centers 102-104 are collectively referred to herein as the proxy components 136-138. The proxy components 136-138 can be deployed over the analytics systems 124-126. The query control component 128 of the computing system 106 can interact with the proxy components 136-138 of the data centers 102-104. For instance, the query control component 128 can transmit a request to execute a task of a query execution plan to the proxy component 136; responsive to receipt of the request, the proxy component 136 can cause the analytics system 124 to execute the task. The proxy components 136-138 can also be configured to transfer data between the data centers 102-104 (e.g., data transfers between the data centers 102-104 effectuated by the proxy components 136-138 can be controlled by the query control component 128). According to an example, the proxy components 136-138 can further be configured to manage respective local caches of intermediate query results used for data transfer optimization, as described herein in greater detail.

The storage 110 of the computing system 106 can further include a workload optimization component 140. The workload optimization component 140 can be configured to determine replication strategies for the data partitions stored in the data centers 102-104. A replication strategy for a particular data partition can specify one or more data centers 102-104 to which the particular data partition is to be replicated if the particular data partition is to be replicated. Further, the workload optimization component 140 can be configured to schedule the tasks of the query execution plan for the analytical query 130 to the data centers 102-104 based on the replication strategies for the data partitions. Accordingly, the query control component 128 can be configured to control the data centers 102-104 to execute the tasks of the query execution plan for the analytical query 130 as scheduled by the workload optimization component 140.

As an amount of global data increases and trans-oceanic bandwidth becomes scarcer, conventional centralized approaches that perform analytics over distributed data by transferring the distributed data to a centralized data center are becoming less effective and/or infeasible. In contrast, the system 100 can support wide area analytics, optimized for bandwidth utilization, over geo-distributed data in data partitions (e.g., relational database tables, etc.) in the analytics systems 124-126 of the data centers 102-104. The query planner component 132 and the workload optimization component 140 can jointly optimize query execution plans and data replication to minimize bandwidth costs. For instance, the workload optimization component 140 can employ an integer program for handling geo-distribution. According to another example, the workload optimization component 140 can utilize a heuristic to determine data replication. Further, the system 100 enables execution of an analytical query that includes substantially any type of operator, such as a join, a nested query, a user-defined function (UDF), a plurality thereof, and so forth, where the operator(s) can be executed upon the geographically distributed data.

While supporting execution of analytics on the geographically distributed data, the system 100 also provides automated handling of fault-tolerance requirements and uses replicated data to improve performance. The data centers 102-104 include sufficient resources (e.g., processor(s) 112 and 116, storage 114 and 118, etc.) to execute substantially any combination of tasks of query execution plans for the analytical queries, while cross-data center bandwidth may be limited. Conventional query planning can optimize query processing (e.g., "What's the best join order?") to minimize computation. In contrast, the system 100 can optimize execution strategy to minimize bandwidth and respect sovereignty. For example, a technique that can be supported by the system 100 is based on caching previous answers to subqueries at the data centers 102-104 and sending a subquery delta (e.g., a difference between the answers to the subqueries). Further, the query optimization approach employed by the system 100 can be based on the analytical queries being repeated (e.g. an analytical query being recurrent). Thus, measurement techniques can be used to measure data transfer costs across data centers 102-104. In contrast, conventional database techniques typically use histograms designed to handle arbitrary queries, which may be inaccurate when dealing with joins and user-defined functions. Moreover, the system 100 can reduce an amount of time it takes for a new record (e.g., collected at one of the end-user facing data management systems 120-122) to be reflected into actionable insight.

The query planner component 132 can be configured to generate the query execution plan for the analytical query 130 and the workload optimization component 140 can be configured to determine the replication strategies for the data partitions and schedule the tasks of the query execution plan for the analytical query 130 to the data centers 102-104 based on bandwidth costs for data transfers between the data centers 102-104. The bandwidth costs for the data transfers between the data centers 102-104 can include replication bandwidth costs for data transfers between the data centers 102-104 to replicate the data partitions. Moreover, the bandwidth costs for the data transfers between the data centers 102-104 can include execution bandwidth costs for data transfers between the data centers 102-104 to execute the tasks of the query execution plan for the analytical query 130.

The workload optimization component 140 can also be configured to determine the replication strategies for the data partitions and schedule the tasks of the query execution plan for the analytical query 130 to the data centers 102-104 based on fault-tolerance constraints for the data partitions and regulatory constraints for the data partitions. A fault-tolerance constraint for a corresponding data partition can specify a minimum number of replicas of the corresponding data partition. Further, a regulatory constraint for a given data partitions can specify a data center to which the given data partition is restricted from being replicated. Thus, a regulatory constraint (e.g., sovereignty constraint) can limit where data can be replicated. By way of illustration, a regulatory constraint may specify that data generated at a data center in Germany is prohibited from leaving German data centers; yet, the claimed subject matter is not so limited.

The storage 110 of the computing system 106 can further include a measurement component 142 configured to modify the query execution plan for the analytical query 130 to generate a modified query execution plan. The modified query execution plan emulates behavior of a query executing according to a new query execution plan, while a physical instantiation of the modified query execution plan respects the query execution plan. For instance, if an initial query execution plan includes copying all data to one data center and executing the query, then the modified query execution plan can enable measuring hypothetical cost of a distributed query, while each sub-goal of the query is executed on the one data center where the data have been copied. Accordingly, bandwidth and other parameters that depend on the specifics of executing the queries (e.g., cardinality of intermediate and final results, runtime costs, etc.) can be measured using the modified query execution plan.

The query execution plan can be modified to collect data transfer measurements for each of the tasks during execution of the modified query execution plan. The measurement component 142 can further be configured to acquire the data transfer measurements for each of the tasks during the execution of the modified query execution plan (e.g., during execution as controlled by the query control component 128). Accordingly, the workload optimization component 140 can be configured to determine the replication strategies for the data partitions and schedule the tasks of the query execution plan for the analytical query 130 to the data centers 102-104 based on the data transfer measurements for each of the tasks as acquired by the measurement component 142.

The measurement component 142 can employ a technique that modifies query execution to collect data transfer measurements, which can potentially increase an amount of computation within individual data centers 102-104. However, obtaining the data transfer measurements enables the workload optimization component 140 to determine the replication strategies and schedule the tasks of the analytical query 130 without worsening the cross-data center bandwidth utilization. The technique utilized to modify the query execution plan is referred to herein as pseudo-distributed measurement. The pseudo-distributed measurement performed by the measurement component 142 can measure data transfer measurements of analytical queries that include joins, nested queries, user-defined functions, and so forth.

The workload optimization component 140 can periodically obtain the measurements from the measurement component 142 (e.g., utilizing the pseudo-distributed measurement technique) to estimate whether changing the query execution plan or the data replication strategy can improve overall performance of the system 100 (e.g., to reduce bandwidth utilization between the data centers 102-104 as well as the computing system 106). Accordingly, the query planner component 132 can be configured to periodically regenerate the query execution plan for the analytical query 130 and the workload optimization component 140 can be configured to periodically determine the replication strategies for the data partitions and schedule the tasks of the query execution plan for the analytical query 130 to the data centers 102-104. Thus, the system 100 supports a repetitive process for regenerating the query execution plan, determining the replication strategies, and scheduling the tasks (e.g., the query execution plan, replication strategies, and scheduling identified during a given round of workload optimization can be used as a starting point for a next round of workload optimization). It is contemplated that the workload optimization component 140 can output suggestions (e.g., to an administrator without initiating a change directly), for example. According to yet another example, the workload optimization component 140 can initiate a direct change based upon the determination of the replication strategies for the data partitions and/or the scheduling of the tasks of the query execution plan.

The analytical query 130 can be included in a core workload of analytical queries executed over the distributed data in the data partitions stored in the data centers 102-104. The core workload of analytical queries can include a slowly evolving set of analytical queries. The core workload can be approximately static, for instance. Thus, the workload optimization component 140 can be configured to tailor policy to maximize performance of the core workload, jointly optimizing query plan, site selection, and data replication. The query execution plan for each analytical query can include deciding join order and execution mechanism (e.g., broadcast join, semi-join, etc.). Moreover, site selection can include determining which data center is used to execute each task for each analytical query. Further, data replication can include determining where each piece of the data management system is replicated for performance and fault-tolerance. By being optimized for the static core workload based on measurements of the analytical queries, general-purpose approximate statistics (e.g., histograms) that yield crude execution cost estimates for one-time queries need not be used.

An exemplary analytical query is now described for purposes of illustration. It is to be appreciated, however, that the claimed subject matter is not limited to the exemplary analytical query described below.

In this example, a data management system can store batch-computed page metadata and a log of user visits to webpages, including information about revenue generated by each visit. Accordingly, the data management system can include a ClickLog table and a PageInfo table as set forth below.

ClickLog(sourceIP, destURL, visitDate, adRevenue, . . . )
PageInfo(pageURL, pageSize, pageRank, . . . )

Following the continuing example, pages are replicated at multiple edge data centers, and users are served a closest available copy of a page. Visits are logged to the data center the user is served from, so that the ClickLog table is partitioned across edge data centers. The PageInfo table can be stored centrally in a master data center where it is updated periodically by an internal batch job.

Now consider the exemplary analytical query, Q, for reporting statistics of users (identified by IP address) generating at least $100 in revenue over a period of time. While SQL syntax is used in the below example, it is contemplated that the claimed subject matter is not so limited, as other types of computations are intended to fall within the scope of the hereto appended claims (e.g., pseudo-distributed execution can be used with substantially any type of computation).

Q: SELECT sourceIP, sum(adRevenue), avg(pageRank)
FROM ClickLog cl JOIN PageInfo pi
ON cl.destURL=pi.pageURL
WHERE pi.pageCategory='Entertainment'
GROUP BY sourceIP
HAVING sum(adRevenue)>100

Supporting the foregoing query via the conventional centralized approach can include transferring updates made to the ClickLog table at each of the data centers to a central data center, where the analytical query is executed. Accordingly, a daily network bandwidth requirement can be proportional to a total size of the updates to the data management system. Assuming 1B users, 6 pages visited per user, and 200 bytes per ClickLog row, then the centralized approach can result in data transfers of roughly (1B*6*200) bytes=1.2 TB per day.

By contrast, the techniques set forth herein for executing the analytics can provide a location-independent query interface over the distributed data. An analyst can submit the analytical query Q unmodified to the query control component 128 of the computing system 106, which can then automatically partition the query and orchestrate distributed execution. For example, the distributed plan can be constructed in two stages: a join order and strategies can be chosen, and tasks can be scheduled to the data centers.

The query planner component 132 can create a physical query execution plan for the logical analytical query Q, explicitly specifying an order in which tables are joined and a choice of distributed join algorithm for processing each join (e.g., broadcast join, semi-join, etc.). In the exemplary analytical query Q, there is one choice, namely, the choice of algorithm for processing the join between the ClickLog and PageInfo tables.

To effectuate the choices, the query planner component 132 can be utilized. The query planner component 132 can include built-in rules that use table statistics to optimize join ordering for a given query. Moreover, the query planner component 132 can identify a choice of distributed join algorithm for each join.

When the query planner component 132 is executed on the query Q, an annotation can be output. The annotation can, for instance, be JOINHINT(strategy=right_broadcast), which indicates that the join should be executed by broadcasting the (smaller) PageInfo table to each data center holding a partition of the (larger) ClickLog table, then computing a local join at each of the data centers.

Figure 2:
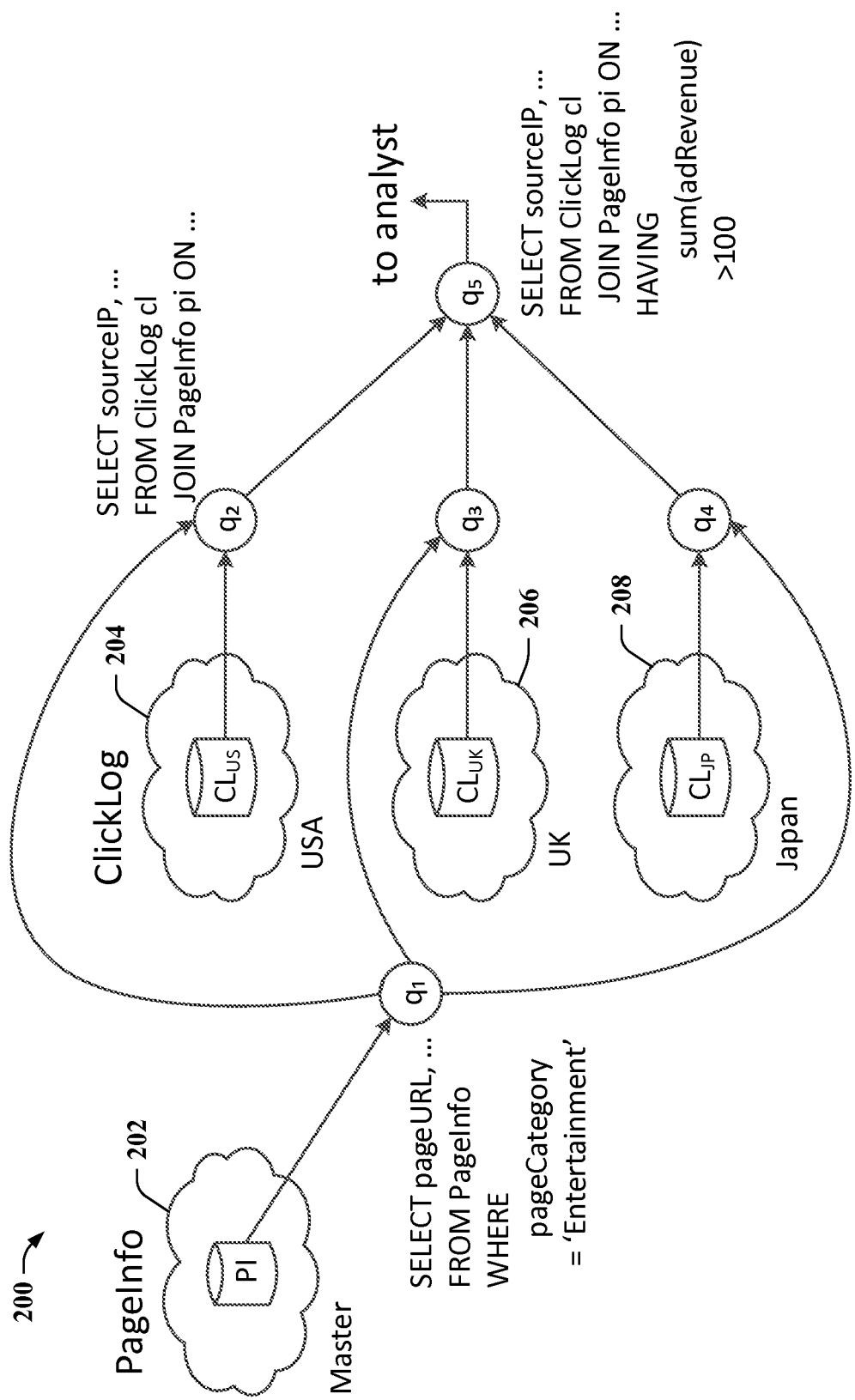
FIG. 2 illustrates an exemplary Direct Acyclic Graph (DAG) corresponding to a query execution plan for an exemplary analytical query Q.

FIG. 2 illustrates an exemplary Direct Acyclic Graph (DAG) 200 corresponding to a query execution plan for the exemplary analytical query Q. As depicted in FIG. 2, the PageInfo table (PI) is stored in a master data center 202. Moreover, a first partition of the ClickLog table ($CL_{US}$) is stored in a data center 204 in the USA, a second partition of the ClickLog table ($CL_{UK}$) is stored in a data center 206 in the UK, and a third partition of the ClickLog table ($CL_{JP}$) is stored in a data center 208 in Japan (e.g., an organization may operate across the three edge data centers 204-208).

A query execution plan that includes five tasks ($q_1$, $q_2$, $q_3$, $q_4$, and $q_5$) can be generated for the analytical query Q. Each of the tasks is represented as a circle in FIG. 2. A task can be a subquery operating on some set of inputs. Further, edges shown in FIG. 2 can depict data dependencies. Tasks can be read as input base data partitions (e.g., task $q_1$) and/or outputs from other tasks (e.g., task $q_5$). The inputs a task utilizes are either already present in a data center or copied to the data center where such task is scheduled. Moreover, while not shown in the example of FIG. 2, regulatory restrictions may prohibit some partitions from being moved to certain data centers, thus constraining task scheduling.

The tasks can be assigned to the data centers 202-208 by the workload optimization component 140, taking into account task input dependencies and base data regulatory constraints. Moreover, multiple copies of base data partitions can be maintained for performance and/or fault-tolerance. It is also contemplated that multiple copies of a task can potentially be scheduled, operating on different partition copies. For instance, a synchronized copy of the PageInfo table can be stored at each data center (e.g., at the data centers 204-208), and multiple copies of task $q_1$ can be created (e.g., a copy of the task $q_1$ can be created at each of the data centers 204-208). A choice of replication strategy can be controlled by the workload optimization component 140 at a longer time scale than an amount of time for execution of a particular analytical query (e.g., the workload optimization component 140 can control the choice of replication strategy on a weekly basis or slower). The workload optimization component 140 can choose the replication policy taking various factors into account as described herein.

According to an example, the workload optimization component 140 can schedule tasks for analytical queries on data centers by solving an integer linear program (ILP) with variables $x_{t,d}=1$ iff a copy of task t is scheduled on data center d. The constraints on the ILP can specify the input dependencies for each task, the fault-tolerance constraints for the data partitions, and the regulatory constraints for the data partitions. The ILP can be utilized to minimize a total cost of data transfers between tasks in the DAG if measurements of inter-task transfer volumes are available (e.g., acquired by the measurement component 142).

Assume an initial setup where data are not replicated. Accordingly, an exemplary strategy can be to schedule task $q_1$ on the master data center 202 that stores the PageInfo table. Further, as part of this exemplary strategy, tasks $q_2$, $q_3$, and $q_4$ can be respectively scheduled on the data center 204 (which stores $CL_{US}$, on which $q_2$ operates), the data center 206 (which stores $CL_{UK}$, on which $q_3$ operates), and the data center 208 (which stores $CL_{JP}$, on which $q_4$ operates). Moreover, task $q_5$ can be co-located with one of task $q_2$, task $q_3$, or task $q_4$. If the query Q is submitted once a day, 1B users visit 100M distinct pages each day, 100K users have an ad revenue larger than $100, each tuple output by $q_1$ is 20 bytes long, and each tuple output by $q_2$, $q_3$, and $q_4$ is 12 bytes long, then distributed execution can transfer 3*100M*20+ (2/3)*1B*12+100K*12=14 GB of data each day, compared to 1.2 TB per day for the centralized approach.

Although the foregoing calculation suggests the distributed approach being more efficient in terms of data transfer costs compared to the centralized approach, if Q is submitted once every 10 minutes, then the centralization approach can be more efficient than the distributed approach. The workload optimization component 140 can evaluate such tradeoff across the entire analytical workload and continuously adapt, reverting to the centralized execution if needed. Further, it is contemplated that analytical queries can be more complex than the exemplary analytical query Q; accordingly, the claimed subject matter is not limited to the foregoing example.

Figure 3:
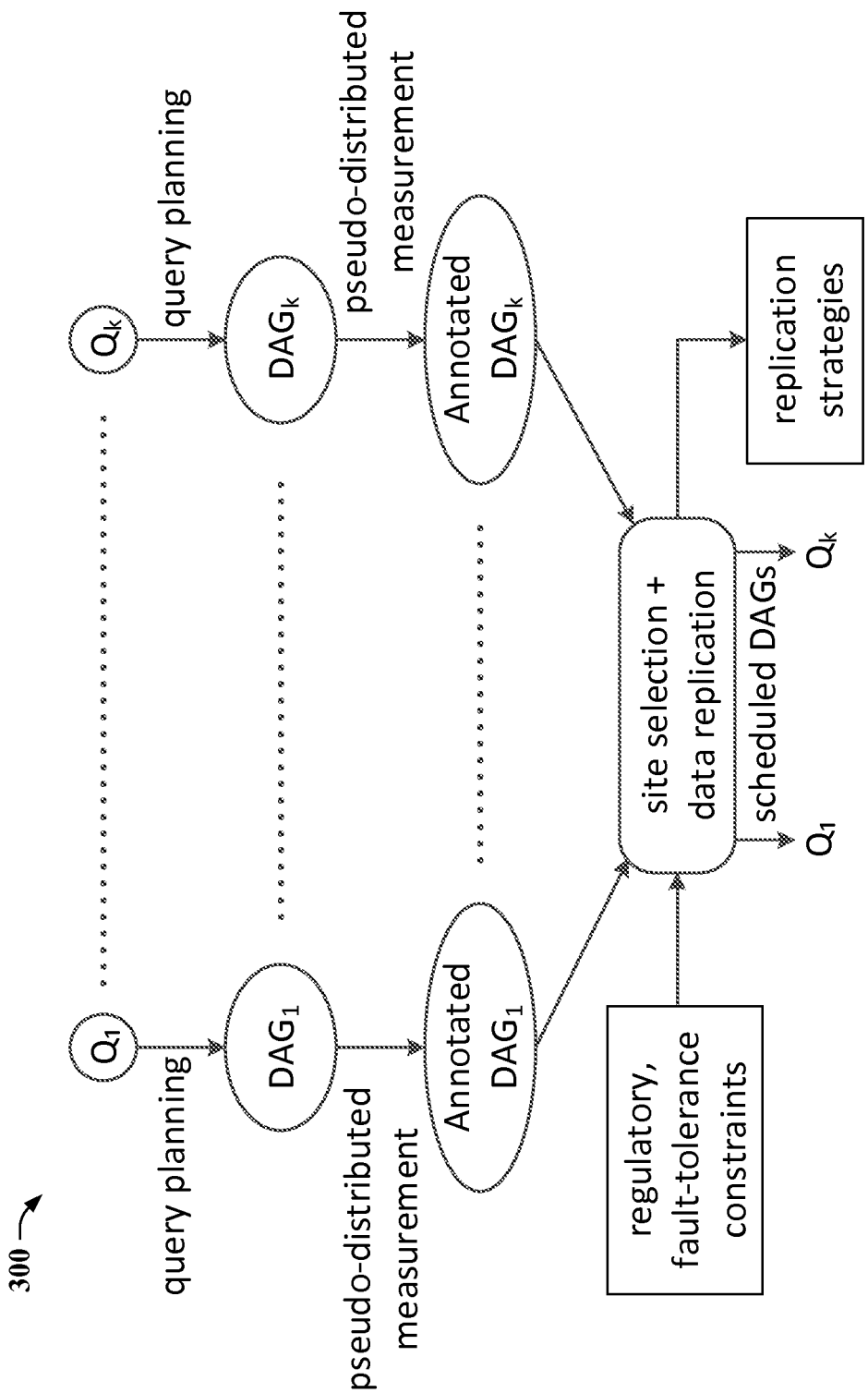
FIG. 3 illustrates an exemplary diagram depicting an optimization performed by a computing system of FIG. 1.

Turning to FIG. 3, illustrated is an exemplary diagram 300 depicting an optimization performed by the computing system 106 of FIG. 1. A core workload of k analytical queries $(Q_1, \ldots, Q_k)$ can be executed by the query control component 128. The query planner component 132 can generate a query execution plan for each of the analytical queries. For instance, a query execution plan for the analytical query $Q_1$ can be represented as $DAG_1$. Likewise, the query execution plans for the remainder of the analytical queries in the core workload can similarly be represented as corresponding DAGs.

The measurement component 142 can collect measures of data transfers during each step of distributed execution for the query execution plans using pseudo-distributed measurement. The measurement component 142 can modify the query execution plans to enable the data transfer measurements to be acquired. Further, annotated DAGs that include the data transfer measurements for each step can be created (e.g., an annotated $DAG_1$ that includes the data transfer measurements for each task in the $DAG_1$ can be created, etc.).

Further, the workload optimization component 140 can combine the data transfer measurements (e.g., from the annotated DAGs) with regulatory and fault-tolerance constraints to jointly solve the site selection and data replication problems. Accordingly, replication strategies for data partitions and scheduled DAGs (e.g., including tasks scheduled to the data centers) can be output.

Input to the query planner component 132 can include a query parse tree and statistics on each table. The query planner component 132 can produce a modified optimized parse tree. Moreover, the query planner component 132 can provide awareness of distributed execution.

The query planner component 132 can optimize queries using statistics, such as a number of rows in each table, an average row size in each table, and an approximate count of a number of distinct values in each column of each table. The statistics can be computed efficiently in a distributed manner. The query planner component 132 can use the statistics (along with uniformity assumptions) to optimize join order. Moreover, the query planner component 132 can employ rules to compare cost of various (distributed) join algorithms, passing in as additional input a number of partitions of each table. An output of the optimization can be an optimized join order annotated with an execution strategy (e.g., which minimizes cost) for each join. Thus, the query planner component 132 can generate estimates for the analytical queries.

The table statistics employed by the query planner component 132 can suffice to compare high-level implementation choices, but estimating actual data transfers that result in each step of distributed execution can be performed by the measurement component 142. Traditional database cardinality estimation techniques can be inaccurate at generating absolute cost estimates, especially when dealing with joins and user-defined functions. Moreover, the volume of data and cross-query optimizations described herein can further complicate statistical estimation utilized with conventional approaches.

In contrast, the measurement component 142 can be configured to measure data transfers when executing a query execution plan in a currently deployed configuration. For instance, the currently deployed configuration can be a centralized deployment or an already running distributed deployment. The measurement component 142 can modify the query execution to enable collecting the data transfer measurements as needed.

Figure 4:
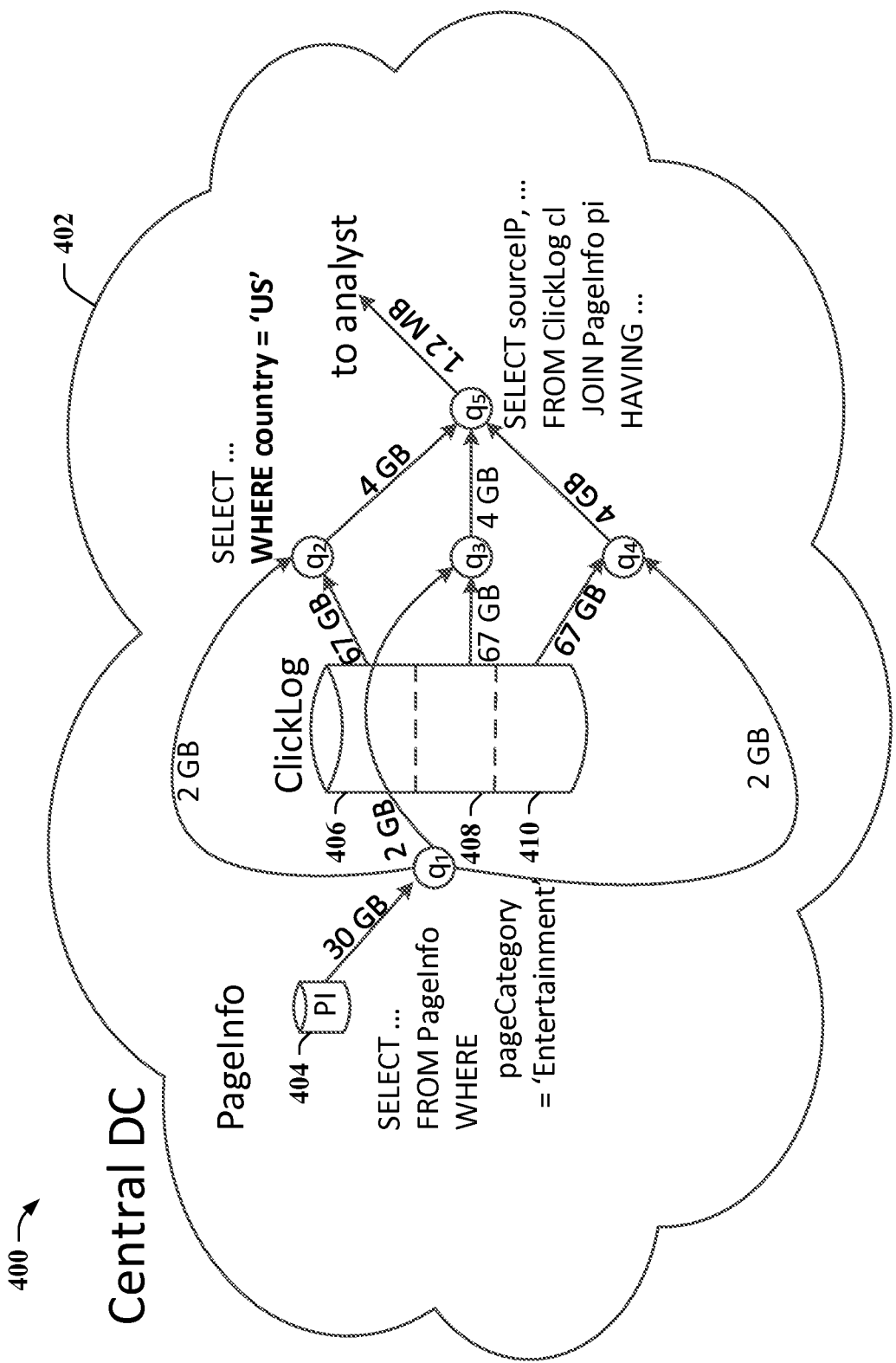
FIG. 4 illustrates an exemplary annotated DAG for the exemplary analytical query Q.

Reference is again made to the exemplary analytical query Q. FIG. 4 depicts an exemplary annotated DAG 400 for the exemplary analytical query Q, with the analytical query Q being executed in a centralized configuration (e.g., an entire data management system being replicated centrally to a central data center 402). To estimate a cost of executing the analytical query Q in a distributed fashion, the measurement component 142 can simulate a virtual topology in which each base data partition is in a separate data center. Accordingly, the measurement component 142 can employ a virtual topology where the PageInfo table 404 as well as the first partition 406 of the ClickLog table, the second partition 408 of the ClickLog table, and the third partition 410 of the ClickLog table are each simulated as being in separate data centers. This can be accomplished by utilizing a where COUNTRY=X clause, constraining each of task $q_2$, task $q_3$, and task $q_4$ to operate on an appropriate partition of the data. For instance, each partitioned table can have a user-specified/system-generated field identifying a partition to which each row belongs; yet, the claimed subject matter is not so limited. Accordingly, the measurement component 142 can enable artificial decomposition to allow inspecting intermediate data sizes and identifying the data transfer volume along each edge in the DAG 400.

After identifying the query execution plan (e.g., DAG of tasks) for each analytical query, and measuring the data transfer along each edge, the workload optimization component 140 can evaluate site selection and data replication. Site selection can specify which data center tasks should be scheduled to and what copies of the partition tasks should read from as input. Moreover, the data replication can specify which data centers each base data partition should be replicated to for performance and/or fault-tolerance while complying with regulatory constraints (e.g., sovereignty constraints).

According to an example, the workload optimization component 140 can be configured to solve an integer linear program (ILP) to jointly determine the replication strategies for the data partitions and schedule the tasks of the query execution plan for the analytical queries to the data centers 102-104. An exemplary ILP that jointly solves for the site selection and data replication to minimize total bandwidth costs is set forth below; yet, it is to be appreciated that the exemplary ILP is provided for illustration purposes, and the claimed subject matter is not so limited.

1. Inputs:
2. D = number of data centers
3. P = number of data partitions
4. G = ⟨V, E⟩ = union of DAGs for core workload queries
5. $b_g$ = number of bytes of data transferred along each edge g ∈ E (from pseudo-distributed measurement)
6. update_rate$_p$ = rate at which partition p is updated by transaction workload (bytes per analytics run)
7. link_cost$_{de}$ = cost ($/byte) of link connecting data centers (DCs) d and e
8. $f_p$ = minimum number of copies of partition p that the system has to make for fault-tolerance
9. R ⊆ P × D = {(p, d) | partition p cannot be copied to data center d due to regulatory constraints}
10. Variables:
11. All variables are binary integers (= 0 or 1)
12. $x_{pd}$ = 1 iff partition p is replicated to DC d
13. $y_{gde}$ = 1 iff edge g in the DAGs is assigned source data center d and destination data center e
14. $z_{td}$ = 1 iff a copy of task t in the DAGs is assigned to data center d
15. Solution:
16. replCost = $\Sigma_{p=1}^{P} \Sigma_{d=1}^{D}$ update_rate$_p$ * $x_{pd}$ * link_cost$_{homeDC(p),d}$
17. execCost = $\Sigma_{g \in E} \Sigma_{d=1}^{D} \Sigma_{e=1}^{D} y_{gde}$ * $b_g$ * link_cost$_{de}$
18.
$$\underset{X,Y}{\text{minimize}}\ \text{replCost} + \text{execCost}$$
19. subject to
20. ∀(p, d) ∈ R: $x_{pd}$ = 0
21. ∀p: $\Sigma_d x_{pd} \geq f_p$
22. ∀d∀e∀g|src(g) is a partition: $y_{gde} \leq x_{src(g),d}$
23. ∀d∀e∀g|src(g) is a task: $y_{gde} \leq z_{src(g),d}$
24. ∀n∀e∀g|dst(g) = n : $z_{ne} = \Sigma_d y_{gde}$
25. ∀n∀p∀d|n reads from partition p ∧ (p, d) ∈ R: $z_{nd}$ = 0
26. ∀n: $\Sigma_d z_{nd} \geq 1$ The ILP is built from two sets of binary variables, namely, $x_{pd}$ which indicates whether partition p is replicated to data center d, and $y_{gde}$ which identifies (source, destination) data center pairs (d, e) to which each edge g in the considered DAGs is assigned. According to an example, edges can be scheduled rather than nodes, however the claimed subject matter is not so limited. Moreover, regulatory and fault-tolerance constraints are inputs in the foregoing exemplary ILP. The ILP can be evaluated to minimize a sum of replication bandwidth costs (replCost) and execution bandwidth costs (execCost).

According to another example, the workload optimization component 140 can be configured to determine the replication strategies for the data partitions and schedule the tasks of the query execution plans for the analytical queries to the data centers 102-104 using a heuristic algorithm. For instance, the heuristic algorithm can be a greedy heuristic. The heuristic algorithm may be utilized for a larger number of data centers as compared to the ILP; yet, the claimed subject matter is not so limited. An exemplary greedy heuristic is set forth below.

1. for all DAG G ∈ workload do
2.   for all task t ∈ toposort(G) do
3.     for all data center d ∈ legal_choices(t) do
4.       cost(d) = total cost of copying t's inputs to d
5.     if lowest cost is zero then
6.       assign copies of t to every data center with cost = 0
7.     else
8.       assign t to one data center with lowest cost
9.   for all (p, d) ∉ R do
10.     check if replicating p to d would further reduce costs
11.   translate decisions so far into values for x, y, z variables in ILP above
12.   solve simplified ILP with pinned values The heuristic approach can use a greedy task placement to solve the site selection problem in isolation. For instance, a set of data centers to which each task can be assigned can be identified based on regulatory constraints over input data. Moreover, the data center to which copying the input data needed by the task would have a lowest-cost can be greedily picked. However, an NP-hard problem of finding a replication strategy subject to fault-tolerance and regulatory constraints can remain. This can be evaluated by the workload optimization component 140 utilizing another ILP in isolation from site selection.

The greedy heuristic can provide enhanced scaling as compared to the ILP approach. Further, the greedy heuristic can enable identifying solutions in a shorter period of time. However, in some cases, the solution identified using the greedy heuristic may be sub-optimal.

According to another example, a hybrid solution that uses the greedy heuristic to generate an initial solution and then uses an integer program to opportunistically search for an alternative can be employed. Following this example, the integer program can start from the initial greedy solution and can be executed for a predetermined duration of time.

Moreover, pursuant to another example, if a core workload of analytical queries are executed following a specified query execution policy (e.g., executed in a same order once every day as a batch), then a cache savings term can be added to the objective function of the ILP. The cache savings term can account for gains from co-scheduling identical tasks from different analytical queries; however, the claimed subject matter is not limited to the foregoing example.

According to yet a further example, intra-query caching can be employed if the same query is run repeatedly to reduce bandwidth utilization between data centers. Following this example, the pseudo-distributed measurements can be collected by the measurement component 142 and stable long-term measurements can be reported. Thus, data transfer measurements used by the integer program can account for the long-term effect of intra-query caching.

Again reference is made to FIG. 1. The query control component 128 can provide a logical, centralized view over data partitioned and/or replicated across the analytics systems 124-126 in multiple data centers 102-104. Recurrent analytical queries (as well as ad-hoc analytical queries) can be submitted to the query control component 128, which can utilize the query planner component 132 to parse and partition the queries to create distributed query execution plans as described herein.

The query control component 128 can manage a data management system that includes one or more tables. Each table can either be partitioned across several data centers 102-104 or replicated at one or more data centers 102-104. Partitioned tables can have a specified partition column, which identifies a partition to which a row belongs. The partition column, for instance, can be used to support pseudo-distributed measurement performed by the measurement component 142 as well as to automatically detect and optimize joins on co-partitioned tables. Partitioned tables can either be value-partitioned, meaning each distinct value of the partition column denotes a separate partition, or range-partitioned on an integer column, meaning each partition corresponds to a specified range of values of the partition column.

According to an example, the query control component 128 can receive information specifying table schema and placement (e.g., from an analyst, when creating a table, etc.); however, the claimed subject matter is not so limited. Moreover, the query control component 128 can support various analytics features, such as nested queries, inner-, outer-, and semi-joins, and user-defined aggregate functions.

Pursuant to various examples, the query control component 128 can support analytical queries that include joins. The query control component 128 can pass user-submitted analytical queries through the query planner component 132 to optimize join order and execution strategy. However, it is contemplated that users can enforce a manual override by explicitly annotating joins with a JOINHINT(strategy=_) instruction.

Various classes of distributed join execution strategies can be supported, including co-located joins, left or right broadcast joins, left or right semi-joins, and hash-joins. Co-located joins can be computed without cross-data center data movement either because both tables are co-partitioned or because one table is replicated at the data centers of other tables. Left or right broadcast joins can have one table broadcast to the data centers of other tables, where separate local joins can then be computed. For left or right semi-joins, a set of distinct join keys from one table can be broadcast and used to identify and retrieve matches from the other table. Moreover, hash-joins can use a partitioning-aware hash function. It is to be appreciated, however, that the claimed subject matter is not limited to the foregoing examples.

Further, nested queries can be supported by the query control component 128. Nested queries can be processed recursively. The nested queries can be pushed down to data center(s) when they can be handled entirely locally, without inter-data center communication. In such case, the results of the nested query are stored partitioned across data centers. For other queries, a final output can be merged and stored locally as a temporary table at a master data center (e.g., the computing system 106 hosting the query control component 128). A result of nested queries can be transferred lazily to other data centers, as and when needed, to execute outer queries.

The query control component 128 further supports user-defined functions (UDFs) (e.g., operating on a single row at a time) and user-defined aggregate functions (UDAFs). For instance, existing user code can run unmodified. For UDAFs, it is noted that the user may be allowed to write functions that process data distributed over multiple machines. Accordingly, an interface in which a user can define 1) a combine function that locally aggregates data at each machine and 2) a reduce function that merges the combined output to compute an answer can be provided. Such interface can be used in a hierarchy to compute UDAFs by using the combine function a second time between steps 1) and 2) above, using it on the combined output from the machines to aggregate data within one data center before passing the data to the reduce function. Moreover, a flag can be set to disable this expansion, in which case the input can be copied to one data center for execution of the UDAF.

Moreover, the query control component 128 can be an extensible substrate; accordingly, narrow optimizations can be implemented on the query control component 128. For instance, function-specific optimizations can be implemented on the query control component 128. Examples of such function-specific optimizations include an algorithm for top-k queries or an approximate percentile algorithm; however, the claimed subject matter is not so limited.

Figure 5:
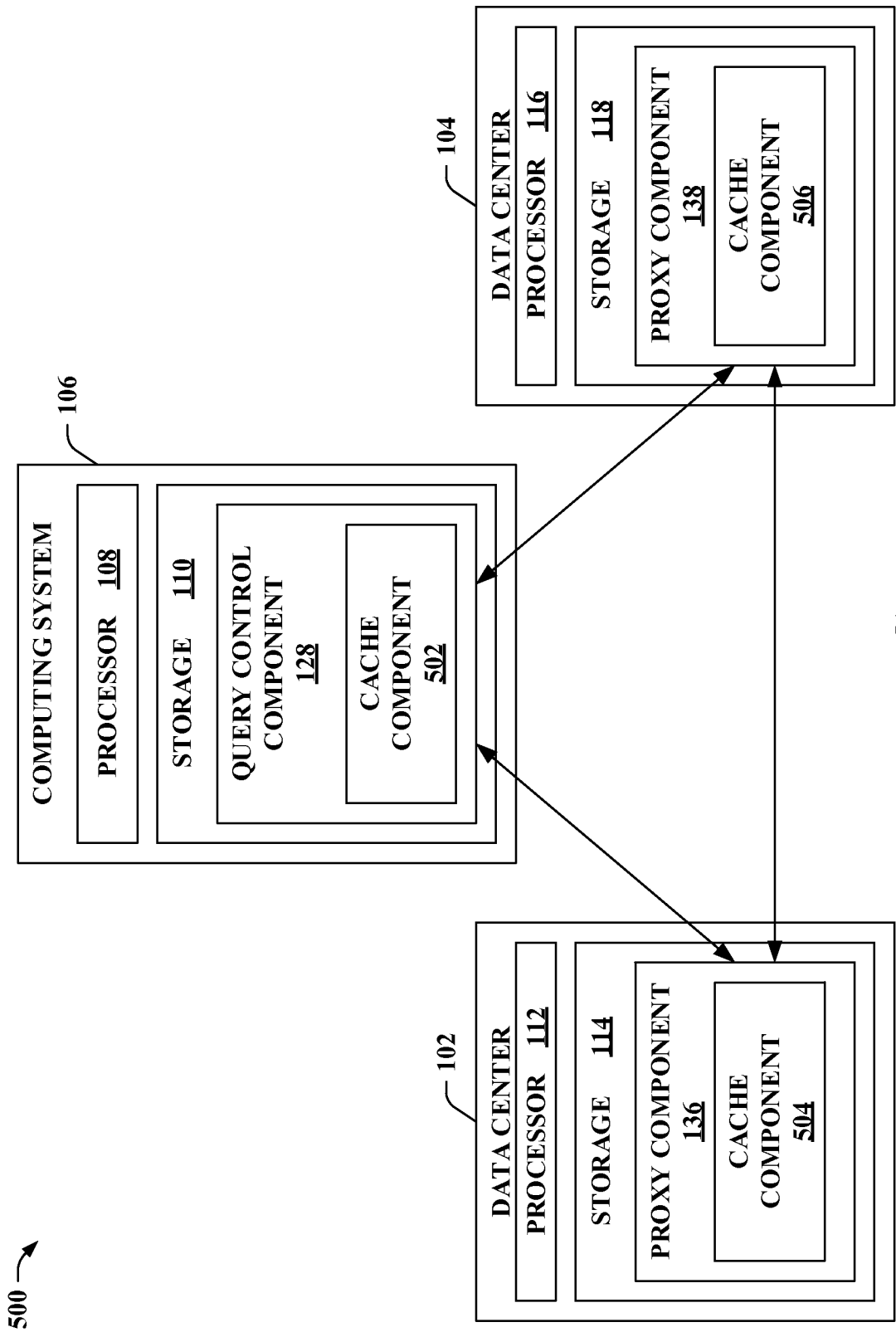
FIG. 5 illustrates a functional block diagram of an exemplary system that controls data transfer between data centers.

Turning to FIG. 5, illustrated is a system 500 that controls data transfer between the data centers 102-104 (and the computing system 106). As described herein, the computing system 106 can include the query control component 128. Moreover, the data center 102 can include the proxy component 136 and the data center 104 can include the proxy component 138. The query control component 128 can further include a cache component 502. Further, the proxy component 136 can include a cache component 504 and the proxy component 138 can include a cache component 506. The cache component 502, the cache component 504, and the cache component 506 are collectively referred to herein as cache components 502-506.

The cache components 502-506 can each be substantially similar. The cache components 502-506 can enable subquery deltas (e.g., a difference between intermediate query results for a subquery executed during differing time periods) to be transferred between the data centers 102-104 and/or the computing system 106. Storage and computation within the data centers 102-104 and/or the computing system 106 can be utilized by the cache component 502-506 to store, retrieve, and compute intermediate query results. The cache components 502-506 can be used to reduce data transfer redundancy by enabling the data centers 102-104 and/or the computing system 106 to exchange subquery deltas as opposed to the intermediate query results. Thus, redundant data can be removed when computing subquery deltas to reduce the data transfer redundancy.

As described herein, the query control component 128 of the computing system 106 can control the data centers 102-104 to execute tasks of a query execution plan for an analytical query and transfer intermediate query results between the data centers 102-104 and the computing system 106. Moreover, the query control component 128 can receive one or more of the intermediate query results from the one or more data centers 102-104. According to an example, the intermediate query results received from the one or more data centers 102-104 can include a subquery delta. The subquery delta can include a difference between a second intermediate query result for a subquery executed during a second time by a given data center and a first intermediate query result for the subquery executed during a first time by the given data center, where the second time period is subsequent to the first time period. Following this example, the cache component 502 can be configured to compute the second intermediate query result for the subquery executed during the second time based on the subquery delta and a stored copy of the first intermediate query result for the subquery executed during the first time period retained by the computing system 106 (e.g., stored in the storage 110).

Exemplary operation of the cache component 504 (as well as the proxy component 136) of the data center 102 is now described. It is to be appreciated that the other cache components 502-506 can be substantially similar to the cache component 504. Following this example, the proxy component 136 of the data center 102 can receive, at the data center 102, a first request for a first intermediate query result for a first subquery to be executed during a first time period. The first subquery can be executed at the data center 102 to compute the first intermediate query result during the first time period. As described herein, the first subquery can be executed over data partitions stored in the data center 102; such data partitions can include at least a first data partition generated locally at the data center 102 (e.g., based on transactions performed at the data center 102, logs produced at the data center 102, results of other portion(s) of a query execution plan executed at the data center 102, etc.) as well as a second data partition generated locally at a disparate data center (e.g., based on transactions performed at the disparate data center, logs produced at the disparate data center, etc.), where the second data partition is replicated to the data center 102. Responsive to the first request, the proxy component 136 can transmit the first intermediate query result for the first subquery from the data center 102 (e.g., to the data center 104, the computing system 106, etc.). Further, the cache component 504 can store, at the data center 102 (e.g., in the storage 114), the first intermediate query results for the first subquery. Thereafter, a second request for a second intermediate query result for the first subquery to be executed during a second time period can be received by the proxy component 136. The second time period can be subsequent the first time period. Moreover, the first subquery can be executed to compute the second intermediate query result during the second time period. The cache component 504 can compute a subquery delta for the first subquery. The cache component 504 can compute the subquery delta for the first subquery delta as a difference between the second intermediate query result for the first subquery and the first intermediate query result for the first subquery as stored. Responsive to the second request, the proxy component 136 can transmit the subquery delta from the data center 102 (e.g., to the data center 104, the computing system 106, etc.). Pursuant to an example, the cache component 504 can replace the first intermediate query result for the first subquery stored in the storage 114 at the data center 102 with the second intermediate query result for the first subquery in the storage 114 at the data center 102; however, according to another example, it is contemplated that both the first intermediate query result and the second intermediate query result for the first subquery can both be stored in the storage 114 at the data center 102.

The description of the exemplary operation of the cache component 502 is continued. The proxy component 136 can receive, at the data center 102, a third intermediate query result for a second subquery executed by a disparate data center (e.g., the data center 104, etc.) during a third time period. The third time period may be before or after the first time period. Further, the third time period may be before or after the second time period. The third intermediate query result can be stored by the cache component 504 at the data center 102 (e.g., in the storage 114). Further, the proxy component 136 can receive, at the data center 102, a subquery delta for the second subquery. The subquery delta for the second subquery can include a difference between a fourth intermediate query result for the second subquery executed by the disparate data center during a fourth time period and the third intermediate query result for the second subquery executed by the disparate data center during the third time period. The fourth time period can be subsequent to the third time period. The cache component 504 can compute, at the data center 102, the fourth intermediate query result for the second subquery based on the subquery delta for the second subquery and the third intermediate query result for the second subquery stored at the data center 102. Further, the cache component 504 can store the fourth intermediate query result for the second subquery in the storage 114 at the data center 102 (e.g., the third intermediate query result for the second subquery may or may not be replaced in the storage 114 by the fourth intermediate query result for the second subquery)

Again, as noted above, it is contemplated that the cache component 502 and the cache component 506 (as well as cache components of other data centers) can be substantially similar to the cache component 504.

Figure 6:
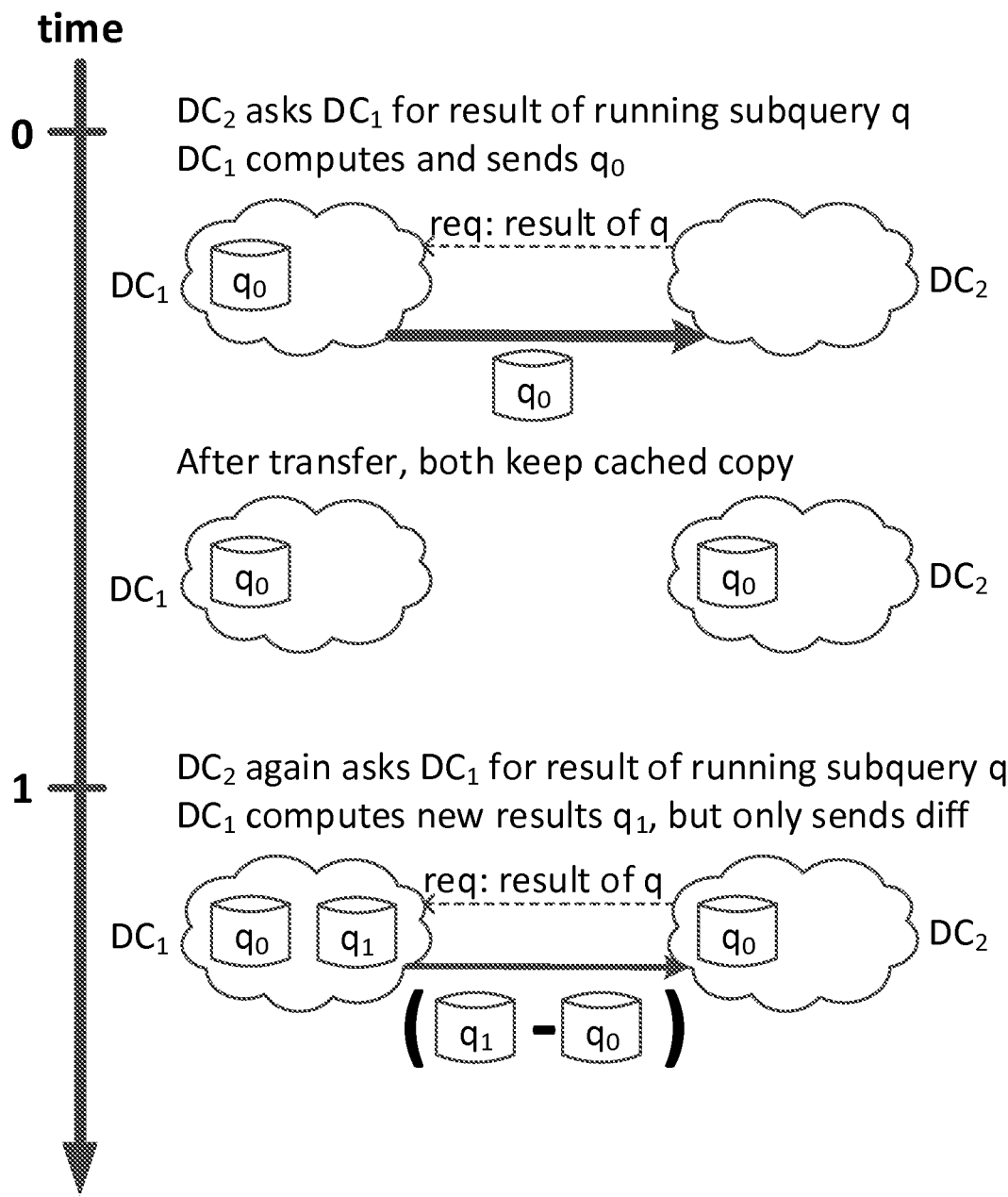
FIG. 6 illustrates exemplary subquery delta mechanism for reducing data transfer between data centers.

Turning to FIG. 6, illustrated is an exemplary subquery delta mechanism for reducing data transfer between data centers. Such mechanism can be utilized to optimize data movement between the data centers. Each node can be a data center with sufficient processing and storage capabilities; however, bandwidth between the data centers can be limited.

Consider an analytical query computing a running average over revenue produced by the most revenue-generating IP addresses over a past 24 hours. If the analytical query is run once an hour, more than 95% of the data transfer can be wasted. For instance, using a conventional approach, the query would be re-computed every hour and a result (including the historical data for the previous 23 hours) would be transferred even though only the last hour of data changed.

As shown in FIG. 6, storage and computation in each data center can be leveraged to cache intermediate query results. For instance, after data center 2 ($DC_2$) receives a result for a query from data center 1 ($DC_1$), both the source and the destination can store the result in a local cache tagged with a signature corresponding to the query. During a next time period, $DC_2$ can retrieve the result for the same query from $DC_1$. $DC_1$ can re-compute the query again, but instead of sending the result afresh, a difference (e.g., delta) between the new and old result can be computed and sent rather than the new result. Note that $DC_1$ still computes the result of the query during the second time period. Caching does not reduce intra-data center computation, rather, it provides reduced data transfer between data centers.

Results can be cached for individual subqueries run against each data center, not just for the final overall results returned to an analyst. Accordingly, caching can assist not only when the analyst submits the same query repeatedly, but also when two different analytical queries use results from the same common subquery. For instance, a subquery can be executed by a given data center as part of a first analytical query to compute a first intermediate query result during a first time period and the subquery can be executed by the given data center as part of a differing second analytical query to compute a second intermediate query result during a second time period. Accordingly, a subquery delta can include a difference between the second intermediate query result and the first intermediate query result. Thus, cross-analytical query optimization can be supported.

Figure 7:
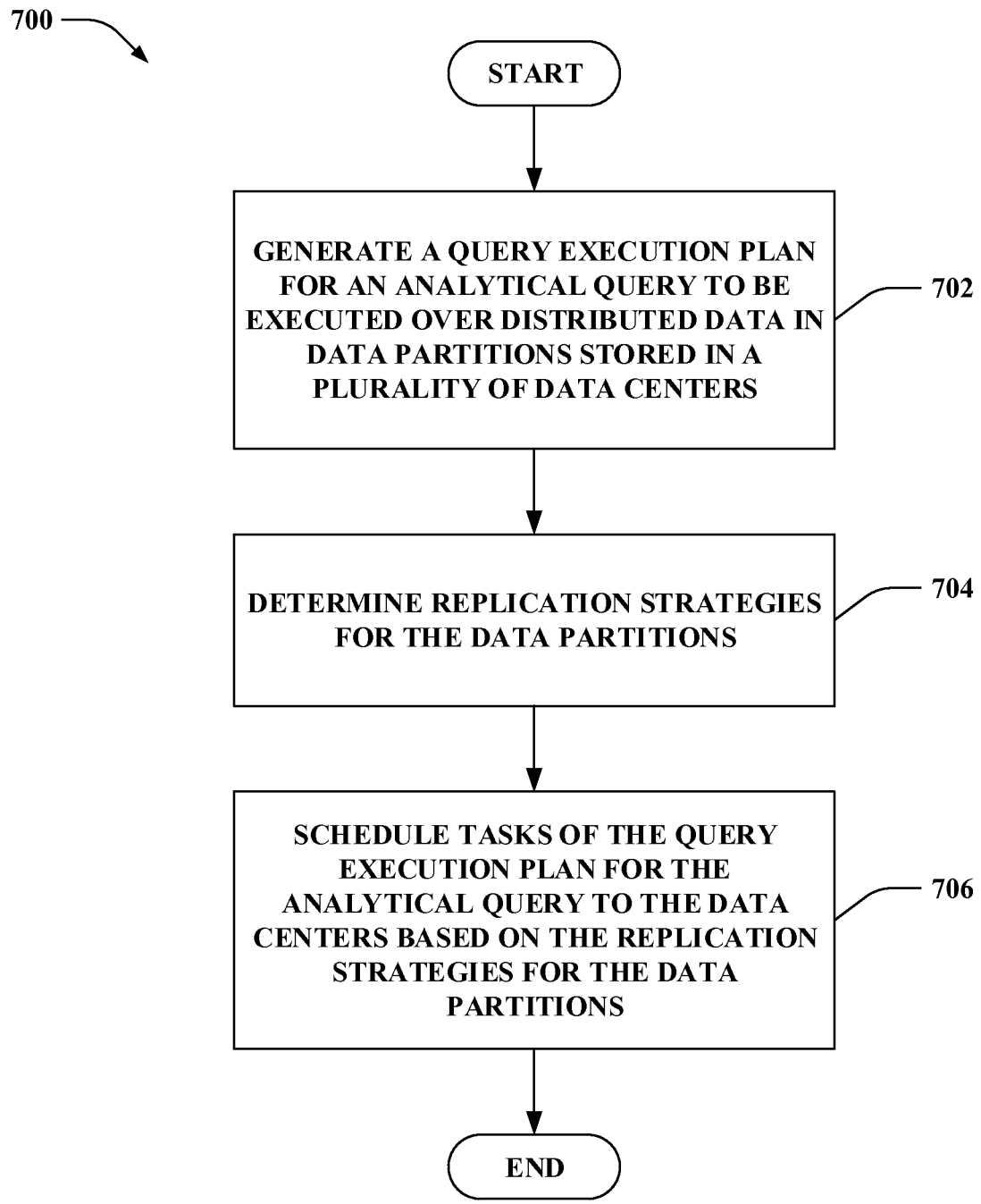
FIG. 7 is a flow diagram that illustrates an exemplary methodology of controlling performance of an analytical query.
Figure 8:
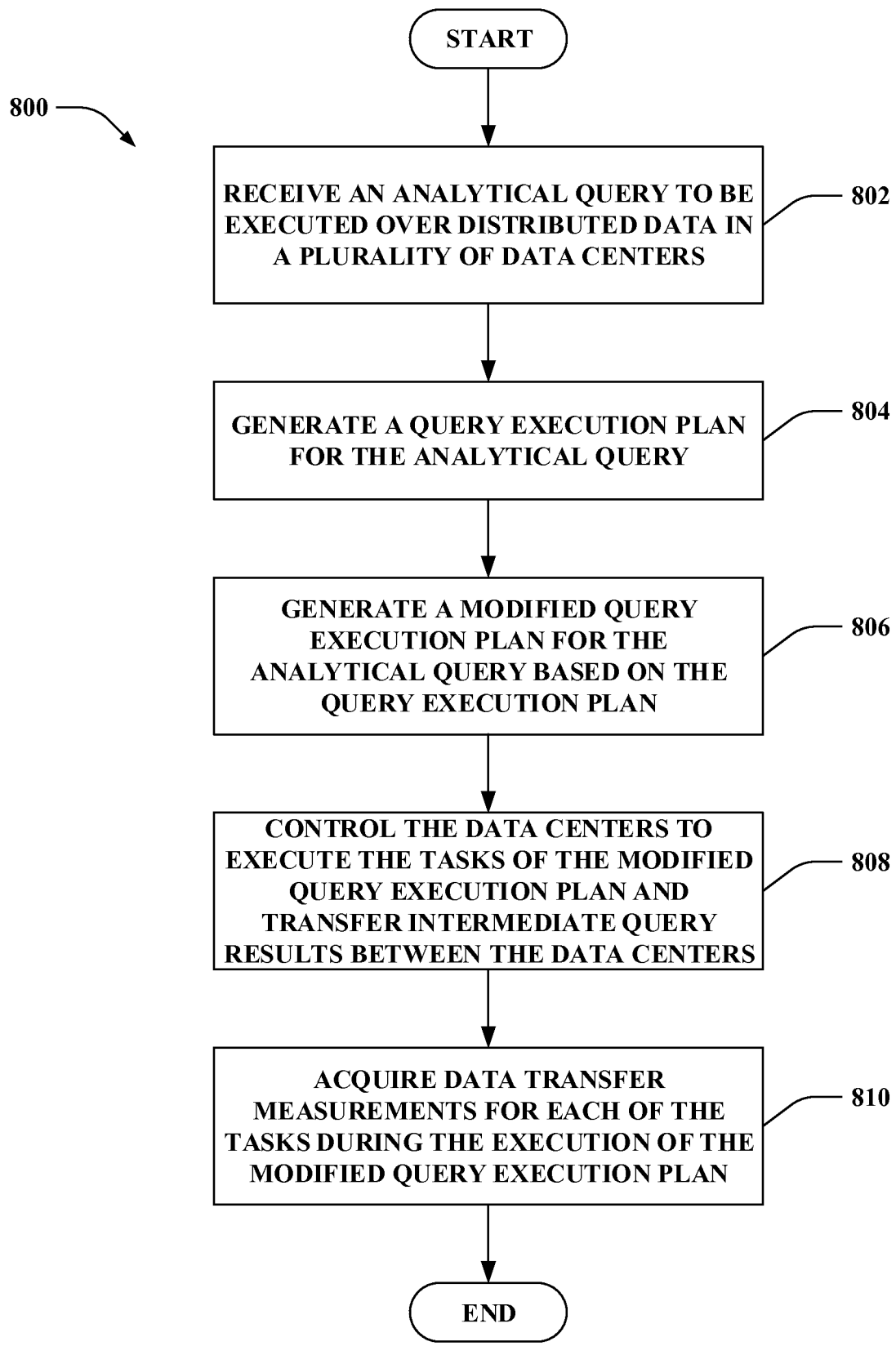
FIG. 8 is a flow diagram that illustrates an exemplary methodology of controlling pseudo-distributed measurement of data transfer between data centers.
Figure 9:
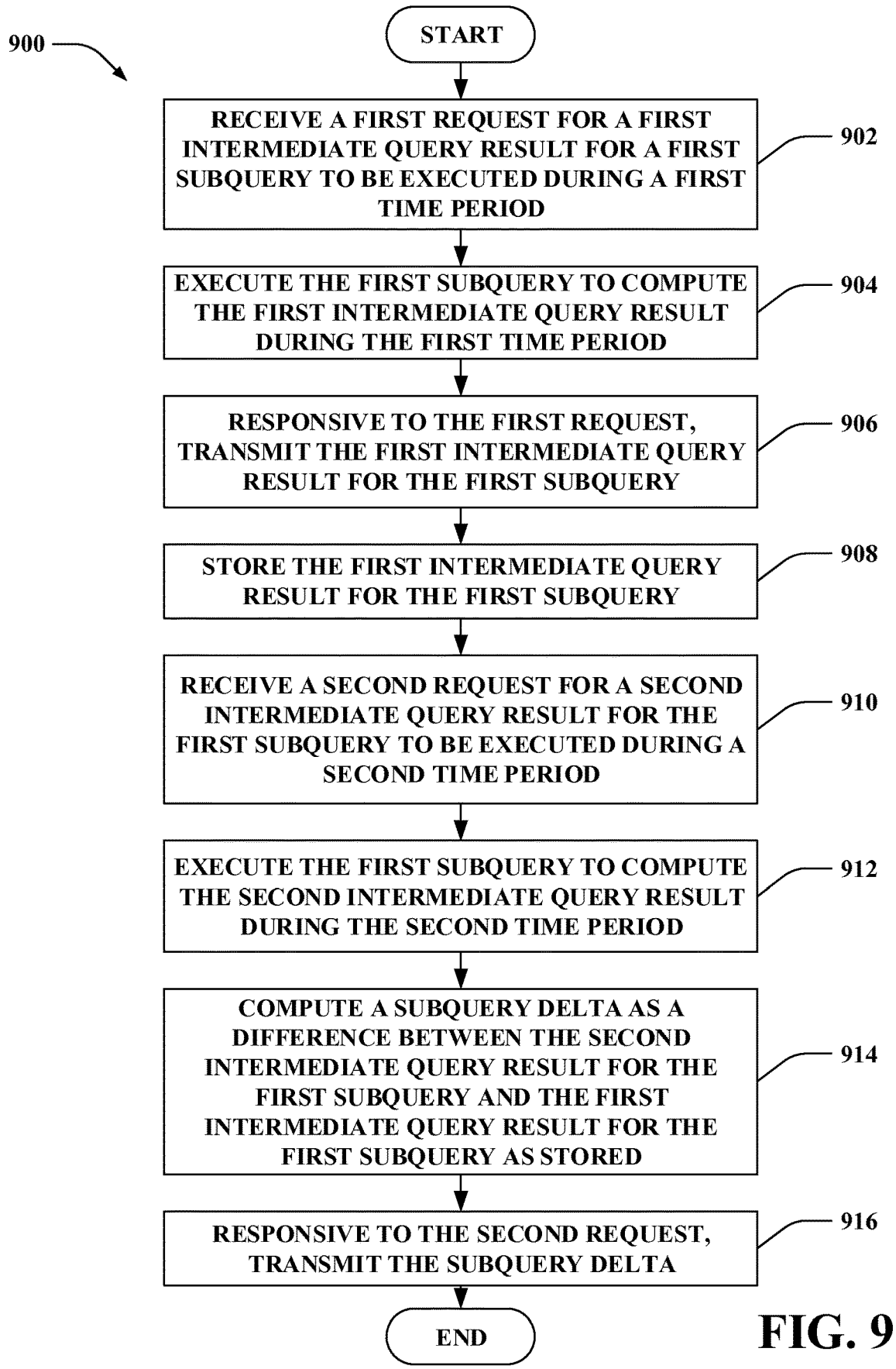
FIG. 9 is a flow diagram that illustrates an exemplary methodology of controlling data transfer.

FIGS. 7-9 illustrate exemplary methodologies relating to performing analytics over distributed data in data partitions stored in a plurality of data centers. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates a methodology 700 of controlling performance of an analytical query (e.g., a recurrent analytical query, a non-recurrent analytical query, etc.). At 702, a query execution plan for the analytical query to be executed over distributed data in data partitions stored in a plurality of data centers can be generated. The query execution plan can include tasks. At 704, replication strategies for the data partitions can be determined. A replication strategy for a particular data partition can specify one or more data centers to which the particular data partition is to be replicated if the particular data partition is to be replicated. At 706, the tasks of the query execution plan for the analytical query can be scheduled to the data centers based on the replication strategies for the data partitions.

Turning to FIG. 8, illustrated is a methodology 800 of controlling pseudo-distributed measurement of data transfer between data centers. At 802, an analytical query (e.g., a recurrent analytical query, a non-recurrent analytical query, etc.) to be executed over distributed data in a plurality of data centers can be received. At 804, a query execution plan for the analytical query can be generated. At 806, a modified query execution plan for the analytical query can be generated based on the query execution plan. The query execution plan can be modified to collected data transfer measurements for each of the tasks during execution of the modified query execution plan. At 808, the data centers can be controlled to execute the tasks of the modified query execution plan and transfer intermediate query results between the data centers. At 810, the data transfer measurements for each of the tasks during the execution of the modified query execution plan can be acquired.

With reference to FIG. 9, illustrated is a methodology 900 of controlling data transfer. At 902, a first request for a first intermediate query result for a first subquery to be executed during a first time period can be received at a data center. At 904, the first subquery can be executed at the data center to compute the first intermediate query result during the first time period. At 906, responsive to the first request, the first intermediate query result for the first subquery can be transmitted from the data center. At 908, the first intermediate query result for the first subquery can be stored in storage at the data center. At 910, a second request for a second intermediate query result for the first subquery to be executed during a second time period can be received at the data center. The second time period can be subsequent to the first time period. At 912, the first subquery can be executed at the data center to compute the second intermediate query result during the second time period. At 914, a subquery delta for the first subquery can be computed at the data center. The subquery delta for the first subquery can be computed as a difference between the second intermediate query result for the first subquery and the first intermediate query result for the first subquery as stored. At 916, responsive to the second request, the subquery delta for the first subquery can be transmitted from the data center.

Figure 10:
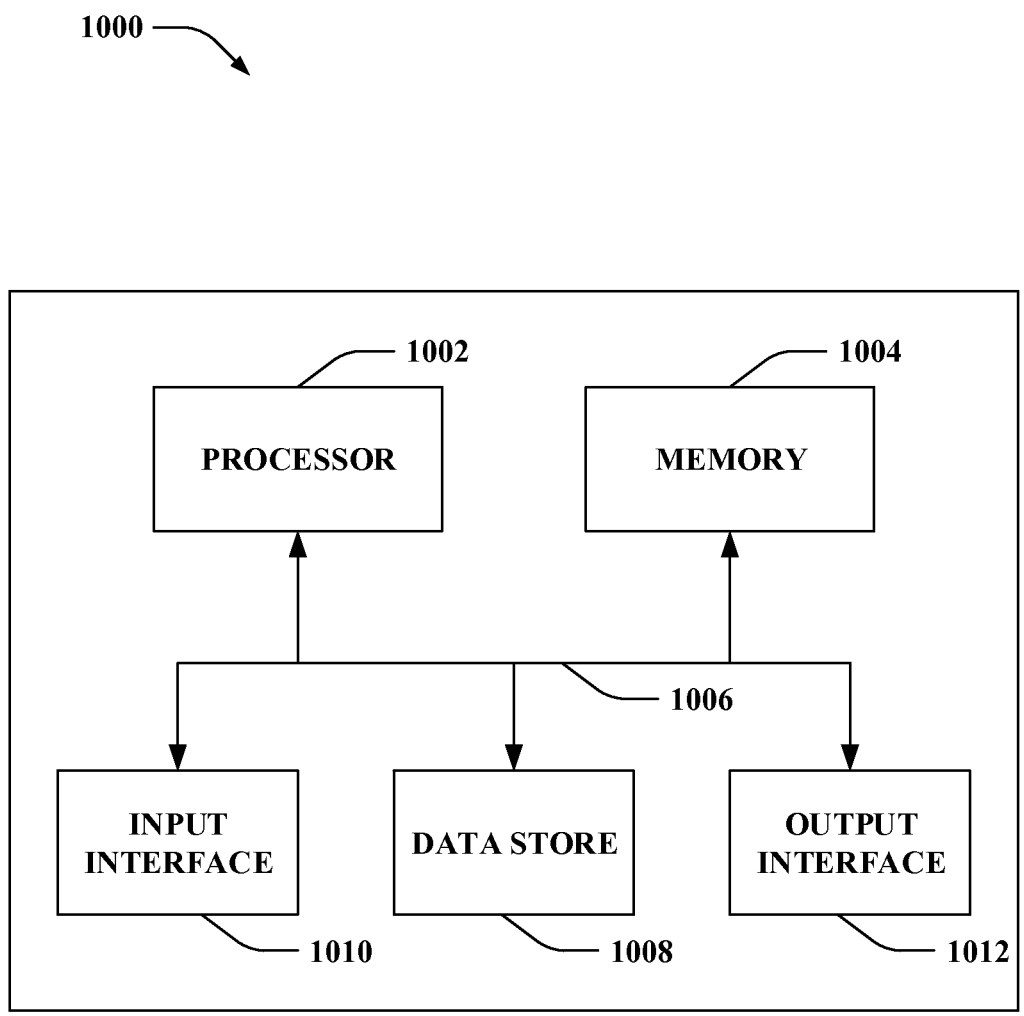
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing system 106 of FIG. 1 may be or include the computing device 1000. According to another example, a data center (e.g., the data center 102, . . . , the data center 104) can include the computing device 1000. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store analytical queries, results, data transfer measurements, intermediate query results, and so forth.

The computing device 1000 additionally includes a data store 1008 that is accessible by the processor 1002 by way of the system bus 1006. The data store 1008 may include executable instructions, analytical queries, results, data transfer measurements, intermediate query results, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Figure 11:
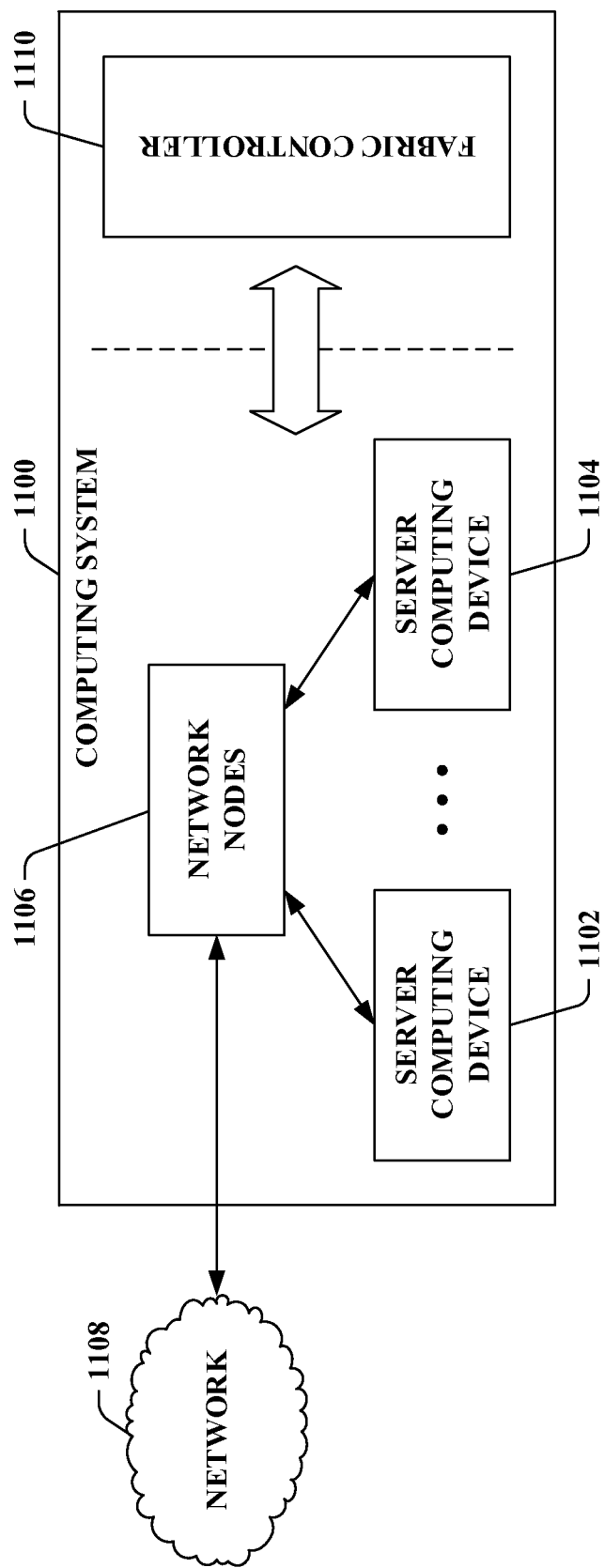
FIG. 11 illustrates an exemplary computing system.

Turning to FIG. 11, a high-level illustration of an exemplary computing system 1100 that can be used in accordance with the systems and methodologies disclosed herein is illustrated. For instance, the computing system 1100 can be or include the computing system 106. Additionally or alternatively, the computing system 106 can be or include the computing system 1100. According to another example, a data center can be or include the computing system 1100. Additionally or alternatively, the computing system 1100 can be or include a data center.

The computing system 1100 includes a plurality of server computing devices, namely, a server computing device 1102, . . . , and a server computing device 1104 (collectively referred to as server computing devices 1102-1104). The server computing device 1102 includes at least one processor and computer-readable storage; the at least one processor executes instructions that are stored in the computer-readable storage. The instructions may be, for instance, instructions for implementing functionality described as being carried out by one or more components discussed above or instructions for implementing one or more of the methods described above. Similar to the server computing device 1102, at least a subset of the server computing devices 1102-1104 other than the server computing device 1102 each respectively include at least one processor and computer-readable storage.

According to an example, processor(s) of one or more of the server computing devices 1102-1104 can be or include the processor 108, and computer-readable storage of one or more of the server computing devices 1102-1104 can be or include the storage 110. By way of another example, processor(s) of one or more of the server computing devices 1102-1104 can be or include the processor 112, and computer-readable storage of one or more of the server computing devices 1102-1104 can be or include the storage 114. Pursuant to a further example, processor(s) of one or more of the server computing devices 1102-1104 can be or include the processor 116, and computer-readable storage of one or more of the server computing devices 1102-1104 can be or include the storage 118.

The computing system 1100 further includes various network nodes 1106 that transport data between the server computing devices 1102-1104. Moreover, the network nodes 1102 transport data from the server computing devices 1102-1104 to external nodes (e.g., external to the computing system 1100) by way of a network 1108. The network nodes 1102 also transport data to the server computing devices 1102-1104 from the external nodes by way of the network 1108. The network 1108, for example, can be the Internet, a cellular network, or the like. The network nodes 1106 include switches, routers, load balancers, and so forth.

A fabric controller 1110 of the computing system 1100 manages hardware resources of the server computing devices 1102-1104 (e.g., processors, memories, data stores, etc. of the server computing devices 1102-1104). The fabric controller 1110 further manages the network nodes 1106. Moreover, the fabric controller 1110 manages creation, provisioning, de-provisioning, and supervising of virtual machines instantiated upon the server computing devices 1102-1104.

Various examples are now set forth.

Example 1

A computing system, comprising: at least one processor; and computer-readable storage comprising components, the components being executable by the at least one processor, the components comprising: a query planner component configured to generate a query execution plan for an analytical query to be executed over distributed data in data partitions stored in a plurality of data centers, the query execution plan comprising tasks; and a workload optimization component configured to: determine replication strategies for the data partitions, a replication strategy for a particular data partition specifies one or more data centers to which the particular data partition is to be replicated if the particular data partition is to be replicated; and schedule the tasks of the query execution plan for the analytical query to the data centers based on the replication strategies for the data partitions.

Example 2

The computing system according to Example 1, the query planner component configured to generate the query execution plan for the analytical query and the workload optimization component configured to determine the replication strategies for the data partitions and schedule the tasks of the query execution plan for the analytical query to the data centers based on bandwidth costs for data transfers between the data centers.

Example 3

The computing system according to Example 2, the bandwidth costs for the data transfers between the data centers comprise: replication bandwidth costs for data transfers between the data centers to replicate the data partitions; and execution bandwidth costs for data transfers between the data centers to execute the tasks of the query execution plan for the analytical query.

Example 4

The computing system according to any of Examples 1-3, the components further comprising: a measurement component configured to: modify the query execution plan for the analytical query to generate a modified query execution plan, the query execution plan being modified to collect data transfer measurements for each of the tasks during execution of the modified query execution plan; and acquire the data transfer measurements for each of the tasks during the execution of the modified query execution plan.

Example 5

The computing system according to Example 4, the workload optimization component further configured to determine the replication strategies for the data partitions and schedule the tasks of the query execution plan for the analytical query to the data centers based on the data transfer measurements for each of the tasks.

Example 6

The computing system according to any of Examples 1-5, the workload optimization component further configured to determine the replication strategies for the data partitions and schedule the tasks of the query execution plan for the analytical query to the data centers based on fault-tolerance constraints for the data partitions and regulatory constraints for the data partitions, a fault-tolerance constraint for a corresponding data partition specifies a minimum number of replicas of the corresponding data partition, and a regulatory constraint for a given data partition specifies a data center to which the given data partition is restricted from being replicated.

Example 7

The computing system according to any of Examples 1-6, the workload optimization component further configured to solve an integer linear program to jointly determine the replication strategies for the data partitions and schedule the tasks of the query execution plan for the analytical query to the data centers.

Example 8

The computing system according to any of Examples 1-6, the workload optimization component further configured to determine the replication strategies for the data partitions and schedule the tasks of the query execution plan for the analytical query to the data centers using a heuristic algorithm.

Example 9

The computing system according to any of Examples 1-8, the query planner component further configured to periodically regenerate the query execution plan for the analytical query and the workload optimization component further configured to periodically determine the replication strategies for the data partitions and schedule the tasks of the query execution plan for the analytical query to the data centers.

Example 10

The computing system according to any of Examples 1-9, the components further comprising: a query control component configured to: receive the analytical query to be executed over the distributed data in the data partitions stored in the data centers; control the data centers to execute the tasks of the query execution plan for the analytical query as scheduled and transfer intermediate query results between the data centers; receive one or more of the intermediate query results from one or more of the data centers; and generate a result responsive to the analytical query based on the one or more intermediate query results received from the one or more data centers.

Example 11

The computing system according to Example 10, wherein the one or more intermediate query results received from the one or more data centers comprises a subquery delta, the subquery delta comprises a difference between: a second intermediate query result for a subquery executed during a second time period by a given data center; and a first intermediate query result for the subquery executed during a first time period by the given data center, the second time period being subsequent to the first time period.

Example 12

The computing system according to Example 11, the query control component further configured to compute the second intermediate query result for the subquery executed during the second time period based on: the subquery delta; and a stored copy of the first intermediate query result for the subquery executed during the first time period retained by the computing system.

Example 13

The computing system according to any of Examples 11-12, the subquery being executed by the given data center as part of the analytical query to compute the second intermediate query result, and the subquery being executed by the given data center as part of a differing analytical query to compute the first intermediate query result.

Example 14

The computing system according to any of Examples 1-13, wherein the analytical query is comprised in a core workload of analytical queries executed over the distributed data in the data partitions stored in the data centers.

Example 15

The computing system according to any of Examples 1-14 being a data center in the plurality of data centers.

Example 16

A method of controlling data transfer, comprising: receiving, at a data center, a first request for a first intermediate query result for a first subquery to be executed during a first time period, an analytical query comprises the first subquery, the analytical query to be executed over distributed data stored in a plurality of data centers, the plurality of data centers comprises the data center; executing, at the data center, the first subquery to compute the first intermediate query result during the first time period; responsive to the first request, transmitting the first intermediate query result for the first subquery from the data center; storing the first intermediate query result for the first subquery in storage at the data center; receiving, at the data center, a second request for a second intermediate query result for the first subquery to be executed during a second time period, the second time period being subsequent to the first time period; executing, at the data center, the first subquery to compute the second intermediate query result during the second time period; computing, at the data center, a subquery delta for the first subquery, the subquery delta for the first subquery being computed as a difference between: the second intermediate query result for the first subquery; and the first intermediate query result for the first subquery as stored; and responsive to the second request, transmitting the subquery delta for the first subquery from the data center.

Example 17

The method according to Example 16, the first subquery being executed over data partitions stored in the data center, the data partitions comprise at least: a first data partition generated locally at the data center; and a second data partition generated locally at a disparate data center, the second data partition being replicated to the data center.

Example 18

The method according to any of Examples 16-17, further comprising: receiving, at the data center, a third intermediate query result for a second subquery executed by a disparate data center during a third time period, the analytical query comprises the second subquery; storing the third intermediate query result for the second subquery in the storage of the data center; receiving, at the data center, a subquery delta for the second subquery, the subquery delta for the second subquery comprising a difference between: a fourth intermediate query result for the second subquery executed by the disparate data center during a fourth time period; and the third intermediate query result for the second subquery executed by the disparate data center during the third time period, the fourth time period being subsequent to the third time period; and computing, at the data center, the fourth intermediate query result for the second subquery based on: the subquery delta for the second subquery; and the third intermediate query result for the second subquery stored at the data center.

Example 19

A computing system, comprising: at least one processor; and computer-readable storage comprising components, the components being executable by the at least one processor, the components comprising: a query control component configured to receive an analytical query to be executed over distributed data in a plurality of data centers; a query planner component configured to generate a query execution plan for the analytical query, the query execution plan comprising tasks; a measurement component configured to generate a modified query execution plan for the analytical query based on the query execution plan, the query execution plan being modified to collect data transfer measurements for each of the tasks during execution of the modified query execution plan; the query control component further configured to control the data centers to execute the tasks of the modified query execution plan and transfer intermediate query results between the data centers; and the measurement component further configured to acquire the data transfer measurements for each of the tasks during the execution of the modified query execution plan.

Example 20

The computing system according to Example 19, the components further comprising a workload optimization component configured to determine replication strategies for the distributed data and schedule the tasks of the analytical query to the data centers based on the data transfer measurements for each of the tasks.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
at least one processor; and
computer-readable storage that stores computer-executable instructions that, when executed by the at least one processor, cause the at least one processor to perform acts comprising:
receiving an analytical query to be executed over distributed data in data partitions stored in geographically distributed data centers;
generating a query execution plan for the analytical query, wherein the query execution plan comprises a plurality of tasks;
determining a replication strategy for at least one of the data partitions, wherein the replication strategy specifies one or more of the geographically distributed data centers to which the at least one data partition is to be replicated;

scheduling the query execution plan and the replication strategy based on combined bandwidth costs for data transfers between the geographically distributed data centers for replicating the at least one data partition and executing the plurality of tasks of the query execution plan;

controlling the geographically distributed data centers to execute the plurality of tasks of the query execution plan for the analytical query as scheduled and transfer intermediate query results between the geographically distributed data centers, wherein at least one of the intermediate query results is based on a subquery delta, wherein the subquery delta comprises a difference between:

a second intermediate query result for a subquery executed during a second time period by a given data center; and a first intermediate query result for the subquery executed during a first time period by the given data center, the second time period being subsequent to the first time period, wherein the second intermediate query result is computed based on the subquery delta and a stored copy of the first intermediate query result for the subquery;

receiving one or more of the intermediate query results from one or more of the geographically distributed data centers; and generating a result responsive to the analytical query based on the one or more intermediate query results received from the one or more geographically distributed data centers.

2. The computing system of claim 1, wherein the plurality of tasks of the query execution plan for the analytical query are scheduled to the geographically distributed data centers based on the bandwidth costs for data transfers between the geographically distributed data centers.

3. The computing system of claim 1, the combined bandwidth costs for the data transfers between the geographically distributed data centers comprise:

replication bandwidth costs for data transfers between the geographically distributed data centers to replicate the data partitions; and execution bandwidth costs for data transfers between the geographically distributed data centers to execute the tasks of the query execution plan for the analytical query.

4. The computing system of claim 1, the computer-readable storage further stores computer-executable instructions that, when executed by the at least one processor, cause the at least one processor to perform acts comprising:

modifying the query execution plan for the analytical query to generate a modified query execution plan, the query execution plan being modified to collect data transfer measurements for each of the plurality of tasks during execution of the modified query execution plan; and acquiring the data transfer measurements for each of the plurality of tasks during the execution of the modified query execution plan.

5. The computing system of claim 4, wherein the replication strategy for the at least one data partition is determined and the plurality of tasks of the query execution plan for the analytical query are scheduled to the geographically distributed data centers further based on the data transfer measurements for each of the plurality of tasks.

6. The computing system of claim 1, wherein the replication strategy for the at least one data partition is determined and the plurality of tasks of the query execution plan for the analytical query are scheduled to the geographically distributed data centers further based on fault-tolerance constraints for the data partitions and regulatory constraints for the data partitions, a fault-tolerance constraint for a corresponding data partition specifies a minimum number of replicas of the corresponding data partition, and a regulatory constraint for a given data partition specifies a data center to which the given data partition is restricted from being replicated.

7. The computing system of claim 1, wherein an integer linear program is solved to jointly determine the replication strategy for the at least one data partition and to schedule the plurality of tasks of the query execution plan for the analytical query to the geographically distributed data centers.

8. The computing system of claim 1, wherein the replication strategy for the at least one data partition is determined and the plurality of tasks of the query execution plan for the analytical query are scheduled to the geographically distributed data centers using a heuristic algorithm.

9. The computing system of claim 1, wherein the query execution plan for the analytical query is periodically regenerated and the replication strategy for the at least one data partition is periodically determined.

10. The computing system of claim 1, the subquery being executed by the given data center as part of the analytical query to compute the second intermediate query result, and the subquery being executed by the given data center as part of a differing analytical query to compute the first intermediate query result.

11. The computing system of claim 1, wherein the analytical query is comprised in a core workload of analytical queries executed over the distributed data in the data partitions stored in the geographically distributed data centers.

12. The computing system of claim 1 being a data center in the plurality of geographically distributed data centers.

13. A method of controlling data transfer, comprising:

receiving an analytical query to be executed over distributed data in data partitions stored in geographically distributed data centers;

generating a query execution plan for the analytical query, wherein the query execution plan comprises a plurality of tasks;

determining a replication strategy for at least one of the data partitions, wherein the replication strategy specifies one or more of the geographically distributed data centers to which the at least one data partition is to be replicated;

scheduling the query execution plan and the replication strategy based on combined bandwidth costs for data transfers between the geographically distributed data centers for replicating the at least one data partition and executing the plurality of tasks of the query execution plan;

controlling the geographically distributed data centers to execute the plurality of tasks of the query execution plan for the analytical query as scheduled and transfer intermediate query results between the geographically distributed data centers, wherein at least one of the intermediate query results is based on a subquery delta, wherein the subquery delta comprises a difference between:

a second intermediate query result for a subquery executed during a second time period by a given data center; and a first intermediate query result for the subquery executed during a first time period by the given data center, the second time period being subsequent to the first time period, wherein the second intermediate query result is computed based on the subquery delta and a stored copy of the first intermediate query result for the subquery, wherein the subquery is executed by the given data center as part of a different analytical query to compute the first intermediate query result;

receiving one or more of the intermediate query results from one or more of the geographically distributed data centers; and generating a result responsive to the analytical query based on the one or more intermediate query results received from the one or more geographically distributed data centers.

14. The method of claim 13, the first subquery being executed over data partitions stored in the data center, the data partitions comprise at least:

a first data partition generated locally at the data center; and a second data partition generated locally at a disparate data center, the second data partition being replicated to the data center.

15. The method of claim 13, further comprising:

receiving, at the data center, a third intermediate query result for a second subquery executed by a disparate data center during a third time period, the analytical query comprises the second subquery;

storing the third intermediate query result for the second subquery in the storage of the data center;

receiving, at the data center, a subquery delta for the second subquery, the subquery delta for the second subquery comprising a difference between:

a fourth intermediate query result for the second subquery executed by the disparate data center during a fourth time period; and the third intermediate query result for the second subquery executed by the disparate data center during the third time period, the fourth time period being subsequent to the third time period; and computing, at the data center, the fourth intermediate query result for the second subquery based on:

the subquery delta for the second subquery; and the third intermediate query result for the second subquery stored at the data center.

16. The method of claim 13, wherein the analytical query is comprised in a core workload of analytical queries executed over the distributed data in the data partitions stored in the geographically distributed data centers.

17. The method of claim 13, wherein the replication strategy for the at least one data partition is determined and the plurality of tasks of the query execution plan for the analytical query are scheduled to the geographically distributed data centers using a heuristic algorithm.

18. The method of claim 13, wherein the query execution plan for the analytical query is periodically regenerated and the replication strategy for the at least one data partition is periodically determined.

19. A computing system, comprising:

at least one processor; and computer-readable storage that stores computer-executable instructions that, when executed by the at least one processor, cause the at least one processor to perform operations, comprising:

receiving an analytical query to be executed over distributed data in data partitions stored in geographically distributed data centers;

generating a query execution plan for the analytical query, wherein the query execution plan comprises a plurality of tasks;

determining a replication strategy for at least one of the data partitions, wherein the replication strategy specifies one or more of the geographically distributed data centers to which the at least one data partition is to be replicated;

scheduling the query execution plan and the replication strategy based on combined bandwidth costs for data transfers between the geographically distributed data centers for replicating the at least one data partition and executing the plurality of tasks of the query execution plan;

controlling the geographically distributed data centers to execute the plurality of tasks of the query execution plan for the analytical query as scheduled and transfer intermediate query results between the geographically distributed data centers, wherein at least one of the intermediate query results is based on a subquery delta, wherein the subquery delta comprises a difference between:

a second intermediate query result for a subquery executed during a second time period by a given data center; and a first intermediate query result for the subquery executed during a first time period by the given data center, the second time period being subsequent to the first time period, wherein the second intermediate query result is computed based on the subquery delta and a stored copy of the first intermediate query result for the subquery, wherein the subquery is executed by the given data center as part of a different analytical query to compute the first intermediate query result;

receiving one or more of the intermediate query results from one or more of the geographically distributed data centers; and generating a result responsive to the analytical query based on the one or more intermediate query results received from the one or more geographically distributed data centers.

20. The computing system of claim 19, wherein determining the replication strategy for the at least one data partition and scheduling the plurality of tasks of the analytical query to the geographically distributed data centers are based on data transfer measurements for each of the plurality of tasks.

* * * * *